United States Patent
Watanabe

(10) Patent No.: US 9,432,857 B2
(45) Date of Patent: Aug. 30, 2016

(54) WIRELESS COMMUNICATION SYSTEM AND METHOD FOR CONTROLLING WIRELESS COMMUNICATION

(71) Applicant: FUJITSU LIMITED, Kawasaki-shi, Kanagawa (JP)

(72) Inventor: Teruyoshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/023,709

(22) Filed: Sep. 11, 2013

(65) Prior Publication Data

US 2014/0119199 A1    May 1, 2014

(30) Foreign Application Priority Data

Oct. 29, 2012    (JP) .................................. 2012-238030

(51) Int. Cl.
*H04W 8/24* (2009.01)
*H04W 8/30* (2009.01)
*H04W 24/04* (2009.01)
*H04W 24/10* (2009.01)
*H04W 28/02* (2009.01)

(52) U.S. Cl.
CPC ............... *H04W 24/04* (2013.01); *H04W 8/24* (2013.01); *H04W 8/30* (2013.01); *H04W 24/10* (2013.01); *H04W 28/0231* (2013.01); *H04W 28/0247* (2013.01)

(58) Field of Classification Search
None
See application file for complete search history.

(56) References Cited

U.S. PATENT DOCUMENTS

| | | | |
|---|---|---|---|
| 6,469,991 B1 | 10/2002 | Chuah | |
| 7,496,348 B2 * | 2/2009 | Srey | H04W 12/08 455/410 |
| 8,385,199 B1 * | 2/2013 | Coward | H04W 28/02 370/230.1 |
| 2008/0037484 A1 | 2/2008 | Sugiura | |

(Continued)

FOREIGN PATENT DOCUMENTS

| | | |
|---|---|---|
| JP | 11-289351 A | 10/1999 |
| JP | 2003-169373 A | 6/2003 |
| JP | 2004-7601 A | 1/2004 |
| JP | 2004-48565 A | 2/2004 |

(Continued)

OTHER PUBLICATIONS

Office Action of Japanese Patent Application No. 2012-238030 dated Jul. 5 2016, with partial, translation.

*Primary Examiner* — Timothy J Weidner
(74) *Attorney, Agent, or Firm* — Arent Fox LLP

(57) ABSTRACT

A wireless communication system includes a wireless base station and an access control device. The wireless base station is configured to perform a wireless communication with a user terminal. The access control device is connected to a higher level network at an upstream side while being connected to the wireless base station at a downstream side and configured to control an access by the wireless base station to the higher level network. The access control device includes a reception unit and a processing unit. The reception unit is configured to receive a first signal transmitted from the wireless base station. The processing unit is configured to perform a processing depending on a type of abnormality which has occurred at the downstream side of the access control device. The type of abnormality is determined, from among plural types of abnormalities, based on the received first signal.

14 Claims, 19 Drawing Sheets

(56) References Cited

U.S. PATENT DOCUMENTS

2011/0207435 A1    8/2011   Hosono
2012/0058759 A1*   3/2012   Lundborg .............. H04B 7/155
                                                            455/424

FOREIGN PATENT DOCUMENTS

| JP | 2006-115156 A | 4/2006 |
| JP | 2009-303138 A | 12/2009 |
| JP | 2010-41260 A | 2/2010 |

* cited by examiner

WIRELESS COMMUNICATION SYSTEM AND METHOD FOR CONTROLLING WIRELESS COMMUNICATION

CROSS-REFERENCE TO RELATED APPLICATION

This application is based upon and claims the benefit of priority of the prior Japanese Patent Application No. 2012-238030 filed on Oct. 29, 2012, the entire contents of which are incorporated herein by reference.

FIELD

The embodiments discussed herein are related to a wireless communication system and a method for controlling wireless communication.

BACKGROUND

There is a type of wireless communication system which includes a wireless base station and a fixed access node. The wireless base station performs a wireless communication with a user terminal. The fixed access node is connected with a higher level network at an upstream side while being connected with a wireless base station at a downstream side. Further, the fixed access node controls an access by the wireless base station to the higher level network.

According to the wireless communication system described above, only a wireless base station permitted to access by the fixed access node is allowed to access the higher level network.

In another type of wireless communication system, an access server connected with a first wireless base station transmits a healthy signal received from the first wireless base station to a second wireless base station. The healthy signal is transmitted from the first wireless base station to the access server according to the Point-to-Point Protocol (PPP). When the reception of the healthy signal from the first wireless base station is delayed, the access server transmits the healthy signal to the second wireless base station even when the healthy signal has not been received.

Further, there is a wireless communication system which measures the communication quality between a base station and a remote host. When a queue overload is detected at the remote host, the wireless communication system transmits a flow control message between the base station and the remote host. When the queue overload is detected at the base station, the wireless communication system discards packets.

Further, there is a wireless communication system which switches a communication rate between a wireless data communication card and a base station according to the amount of data communications between an electronic equipment and the wireless data communication card. A data communication according to the PPP is performed between the electronic equipment and the wireless data communication card. Further, there is a wireless communication system which estimates the communication quality and determines whether the contents need to be distributed or not based on the estimated communication quality.

Related techniques are disclosed in, for example, Japanese Laid-Open Patent Publication No. 2010-41260, Japanese Laid-Open Patent Publication No. 2003-169373, Japanese Laid-Open Patent Publication No. H11-289351, Japanese Laid-Open Patent Publication No. 2004-7601 and Japanese Laid-Open Patent Publication No. 2004-48565.

However, while various types of abnormalities may occur in the wireless communication systems described above, the wireless communication systems described above may not efficiently cope with the abnormalities.

SUMMARY

According to an aspect of the present invention, provided is a wireless communication system including a wireless base station and an access control device. The wireless base station is configured to perform a wireless communication with a user terminal. The access control device is connected to a higher level network at an upstream side while being connected to the wireless base station at a downstream side and configured to control an access by the wireless base station to the higher level network. The access control device includes a reception unit and a processing unit. The reception unit is configured to receive a first signal transmitted from the wireless base station. The processing unit is configured to perform a processing depending on a type of abnormality which has occurred at the downstream side of the access control device. The type of abnormality is determined, from among plural types of abnormalities, based on the received first signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
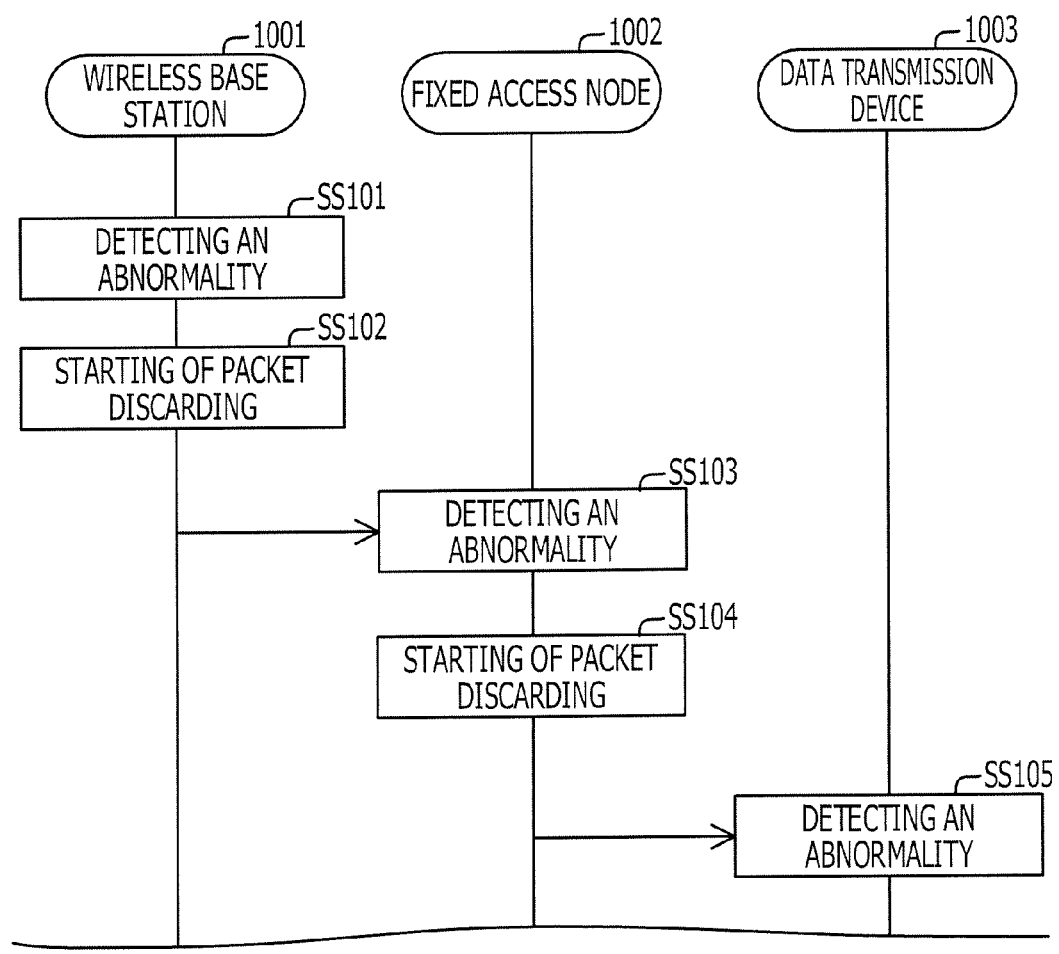
FIG. 1 is a sequence chart illustrating an operation when abnormality has occurred in a wireless communication system according to a related technology.

There have been problems in the conventional wireless communication system that includes, as illustrated in FIG. 1, a wireless base station 1001, a fixed access node 1002, and a data transmission device 1003 as a higher level device. The wireless base station 1001 performs a wireless communication with a user terminal (not illustrated).

In the present example, it is assumed that the data transmission device 1003 transmits, via the fixed access node 1002 and the wireless base station 1001 in this order, packets to the user terminal located within a coverage area of the wireless base station 1001. The wireless base station 1001 is capable of wirelessly communicating with the wireless base station 1001. It is further assumed that an abnormality (an abnormality in a wireless communication section) has occurred in the wireless communication between the wireless base station 1001 and the user terminal.

When an abnormality has occurred in a wireless communication section, the wireless base station 1001 detects that the number of times that a response to packet transmission has not been received from the user terminal becomes a predetermined threshold value or more to detect the abnormality (SS101). Accordingly, the wireless base station 1001 starts to discard the packets destined for the user terminal among the packets received from the fixed access node 1002 (SS102).

Thereafter, the fixed access node 1002 detects an abnormality in packet transmission to the wireless base station 1001 at, for example, an application layer in the Open Systems Interconnection (OSI) reference model (SS103). Accordingly, the fixed access node 1002 starts to discard packets destined for the wireless base station 1001 among the packets received from the data transmission device 1003 (SS104).

Thereafter, the data transmission device 1003 detects an abnormality in packet transmission to the fixed access node 1002 at, for example, an application layer in the OSI reference model (SS105). As described above, the detection of abnormality is performed sequentially in the wireless transmission system starting from the wireless base station 1001 to the data transmission device 1003.

As a result, a relatively large delay occurs until the data transmission device (higher level device) 1003 detects an abnormality after the abnormality has occurred. That is, a time required for a higher level device to know that the abnormality has occurred might be prolonged. As a result, for example, a relatively large number of packets have been discarded until the higher level device performs a processing to deal with the occurrence of abnormality.

Furthermore, in the wireless communication system, the higher level device may not determine where in communications the abnormality has occurred, between the user terminal and the wireless base station 1001 or between the wireless base station 1001 and the fixed access node 1002. Accordingly, an appropriate control depending on the type of abnormality that has occurred may not have been performed.

Hereinafter, the respective embodiments of a wireless communication system, a method for controlling wireless communication, an access control device and a wireless base station will be described with reference to FIG. 2 to FIG. 19 in order to cope with at least one of the problems to be solved described above.

First Embodiment

Configuration

Figure 2:
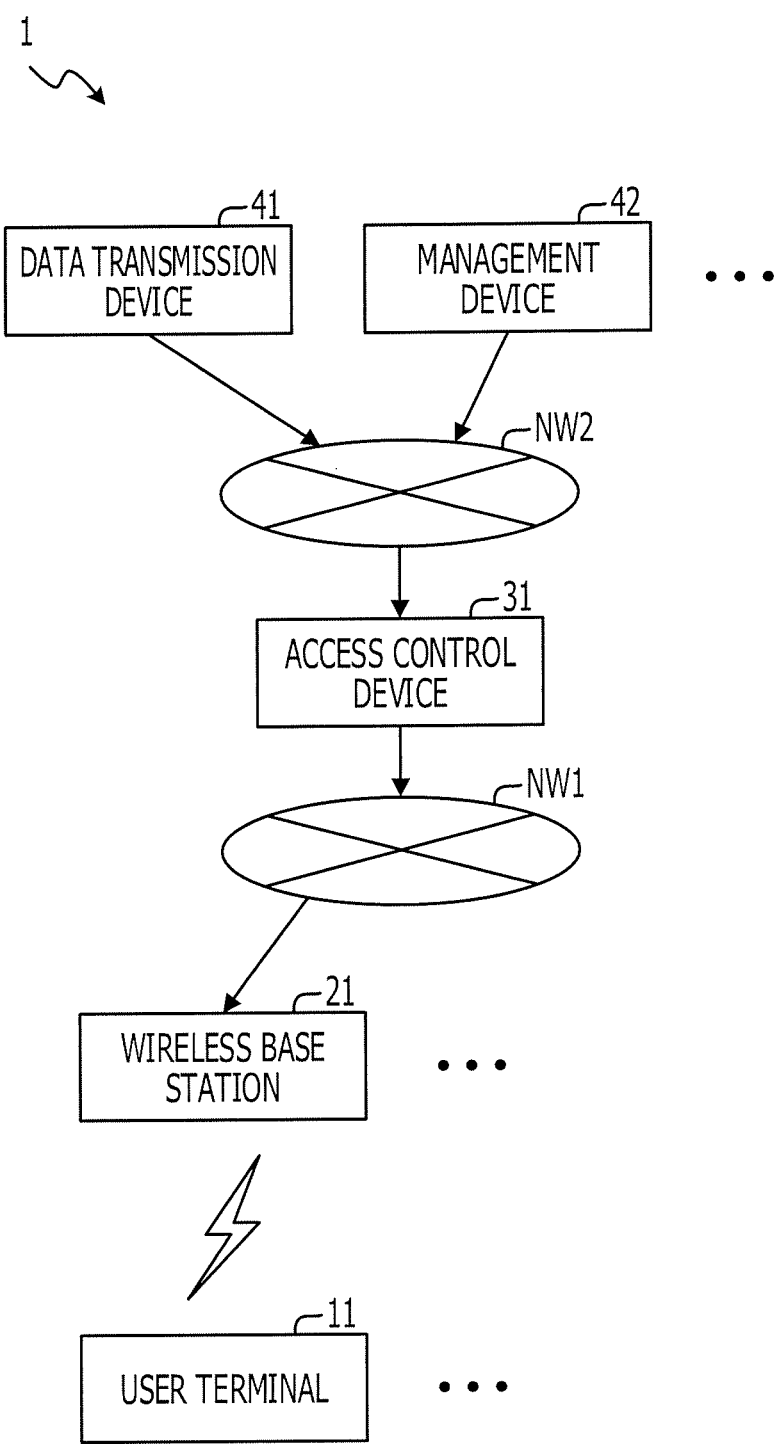
FIG. 2 is a diagram illustrating an exemplary configuration of a wireless communication system according to a first embodiment.

As illustrated in FIG. 2, a wireless communication system 1 according to a first embodiment includes a plurality of user terminals (mobile stations) including a user terminal 11, a plurality of wireless base stations (base stations) including a wireless base station 21, an access control device 31, a data transmission device 41 and a management device 42.

The wireless base station 21 and the access control device 31 are connected to a first communication network NW1. That is, the wireless base station 21 and the access control device 31 may be said to be included in the first communication network NW1. In the present embodiment, the first communication network NW1 is a communication network (for example, local area network (LAN)) conforming to the Ethernet (registered trademark) standard.

Further, the access control device 31, the data transmission device 41 and the management device 42 are connected to a second communication network NW2. That is, the access control device 31, the data transmission device 41 and the management device 42 may be said to be included in the second communication network NW2. In the present embodiment, the second communication network NW2 is a network conforming to the Internet Protocol (IP). The second communication network NW2 is an example of a higher level network (higher level communication network).

That is, in the present embodiment, the access control device 31 is connected to the second communication network NW2 at an upstream side while being connected to the wireless base station 21 at a downstream side.

In the present embodiment, the wireless communication system 1 constitutes a Long Term Evolution (LTE). Accordingly, the wireless base station 21 is referred to as an evolutional Node B (eNB) as well. The user terminal 11 is referred to as a User Equipment (UE) as well. Further, the access control device 31 is referred to as a fixed access node or an Access Concentrator (AC) as well.

In the present embodiment, the data transmission device 41 constitutes a Mobility Management Entity (MME) and a Serving Gateway (S-GW). Further, the management device 42 is referred to as an Operation Equipment (OPE) as well. Each of the data transmission device 41 and the management device 42 is an example of the higher level device. Further, the data transmission device 41 and the management device 42 constitute a higher level device group.

The wireless communication system 1 may constitute a wireless communication system other than the LTE. The management device 42 is a communication network which is connected to the second communication network NW2, and also may be connected to a communication network other than the first communication network NW1. Further, the wireless communication system 1 may further include other higher level devices in addition to the data transmission device 41 and the management device 42.

Figure 3:
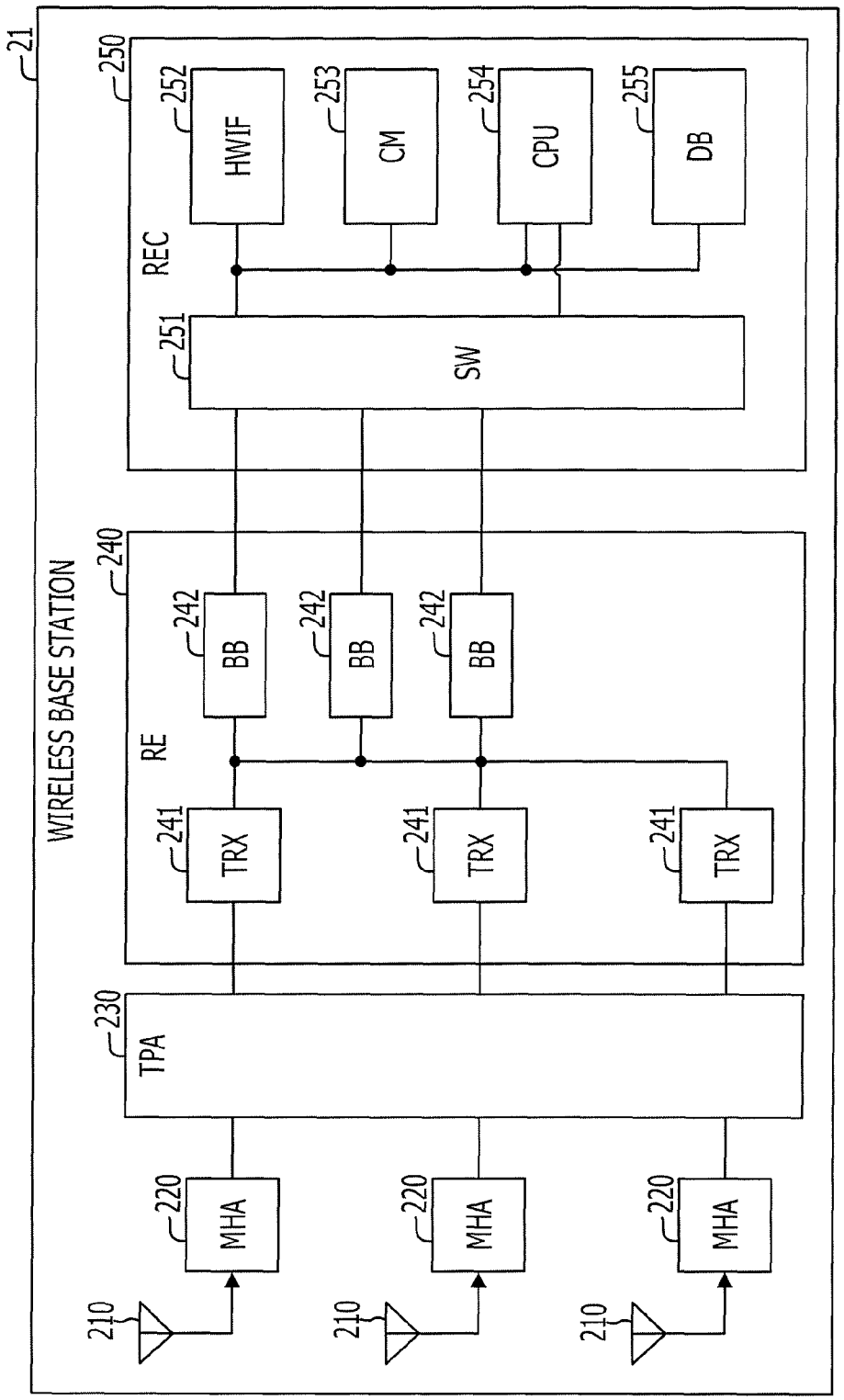
FIG. 3 is a diagram illustrating an exemplary configuration of a wireless base station of the first embodiment.

Next, an example of a specific configuration of each device will be described. As illustrated in FIG. 3, each wireless base station 21 includes plural antennas 210 (for example, three antennas in the present embodiment), plural Mast Head Amplifiers (MHAs) 220 (for example, three MHAs in the present embodiment), a Transmit Power Amplifier (TPA) 230, a Radio Equipment (RE) 240, and a Radio Equipment Controller (REC) 250.

A cell is allocated to each wireless base station 21 and each wireless base station 21 is configured to be able to communicate with the user terminal 11 located within its own cell.

Each cell is divided into areas called sectors. Each sector is provided with a single antenna 210 and a single MHA 220. Each antenna 210 is a wireless interface which transmits and receives radio signals to and from the user terminal 11. Each antenna 210 is configured to be able to transmit and receive radio signals to and from the user terminal 11 located within the sector corresponding to each antenna. For example, each antenna is a directional antenna.

Each MHA 220 amplifies the signals transferred between the antenna 210 and the TPA 230. The TPA 230 amplifies the signals transferred between the MHA 220 and the RE 240.

The RE 240 includes plural Transmitters/Receivers (TRXs) 241 (for example, three TRXs in the present embodiment) and plural Baseband Units (BBs) 242 (for example, three BBs in the present embodiment).

Each TRX 241 converts (up conversion) the baseband signals (downlink signals destined for the user terminal 11) received from the BBs 242 to a radio frequency and outputs the signals after the frequency conversion to the TPA 230.

Further, each TRX 241 converts (down conversion) the radio signals (uplink signals) received from the TPA 230 to a baseband frequency and outputs the signals after the frequency conversion to the BBs 242.

Each BB 242 performs a baseband processing on the signals received from a switch (SW) 251 (described later) of the REC 250 and outputs the signals after the baseband processing to the TRXs 241. The baseband processing includes, for example, an encoding and a modulation. Further, each BB 242 performs a baseband processing for baseband signals received from the TRXs 241 and outputs the signals after the baseband processing to the SW 251 of the REC 250. The baseband processing includes, for example, a decoding and a demodulation.

The REC 250 includes the SW 251, a High Way Interface (HWIF) 252, a Common Memory (CM) 253, a Call Processing Unit (CPU) 254, and a Data Base Unit (DB) 255.

The SW 251 switches connection between the BBs 242 and the HWIF 252 under the control of the CPU 254. Specifically, the SW 251 outputs the signals from the BBs 242 to the HWIF 252 while outputting signals from the HWIF 252 to any one of the BBs 242.

The HWIF 252 is an interface for communicating with other devices (nodes). The HWIF 252 includes both S1 interface and X2 interface. The other nodes may include, for example, other wireless base stations 21, data transmission devices 41 and management devices 42. For example, the HWIF 252 transmits and receives signals in Control-Plane as well as signals in User-Plane via at least either the S1 interface or the X2 interface.

The CM 253 stores data used for the operation of the CPU 254. For example, the CM 253 temporarily stores at least some of data stored in the DB 255. The CM 253 may store information (for example, information regarding the time of day or information regarding the time taken for processing) acquired by the HWIF 252.

The CPU 254 controls the SW 251 based on data stored in at least one of the CM 253 and the DB 255 to control the path of a signal transmitted and received between the user terminals 11 and the other nodes. The data includes, for example, application data and setting data used for performing, for example, a call control.

The DB 255 stores data needed for the operation of the wireless base station 21. In the present embodiment, the DB 255 stores information for managing associations established with other wireless base stations 21.

Information stored in the DB 255 includes, for example, an association number, an end point used by the wireless base station 21, Stream Control Transmission Protocol (SCTP) parameters (for example, a source port number and a destination port number), an IP address assigned to the wireless base station 21 and an IP address assigned to the peer node.

In the present embodiment, the wireless base station 21 includes plural antennas 210 and plural MHAs 220, but may include only one of the antennas and one of the MHAs.

Figure 4:
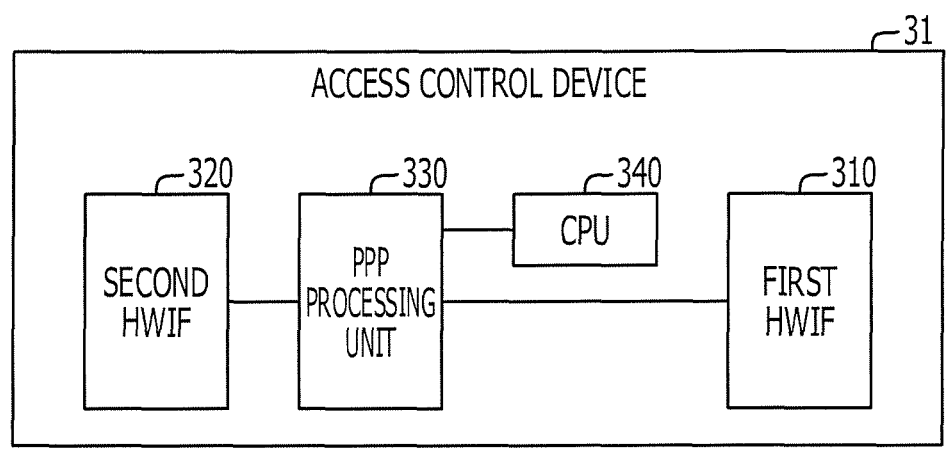
FIG. 4 is a diagram illustrating an exemplary configuration of an access control device of the first embodiment.

As illustrated in FIG. 4, the access control device 31 includes a first HWIF 310, a second HWIF 320, a PPP processing unit 330, and a CPU 340.

The first HWIF 310 is connected to the second communication network NW2. That is, the first HWIF 310 is an interface for communicating with a node (the higher level devices 41, 42) connected to the second communication network NW2.

The second HWIF 320 is connected to the first communication network NW1. That is, the second HWIF 320 is an interface for communicating with nodes (the wireless base stations 21) connected to the first communication network NW1.

The PPP processing unit 330 establishes a session according to the PPP with the wireless base stations 21. Specifically, the PPP processing unit 330 authenticates whether a peer wireless base station 21 is an authorized wireless base station. When it is authenticated that the peer wireless base station 21 is an authorized wireless base station, the PPP processing unit 330 assigns an IP address to the peer wireless base station 21 and thus, the session with the peer wireless base station 21 is established.

The wireless base stations 21 are configured to be connectable to the second communication network NW2 via a session established by the PPP processing unit 330. That is, the wireless base stations 21 access the second communication network NW2 (for example, communicate with nodes connected to the second communication network NW2) via the session established by the access control device 31. In other words, the access control device 31 controls accessing by the wireless base stations 21 to the second communication network NW2.

The PPP processing unit 330 encapsulates (adds a PPP header to a packet) the data received from the first HWIF 310 and outputs the encapsulated data to the second HWIF 320. The PPP processing unit 330 decapsulates (removes the PPP header from the packet) the data received from the second HWIF 320 and outputs the decapsulated data to the first HWIF 310.

The CPU 340 manages an encapsulation policy and a decapsulation policy in the PPP processing unit 330. Further, the CPU 340 manages the IP addresses to be assigned to the wireless base stations 21 in the PPP processing unit 330.

Figure 5:
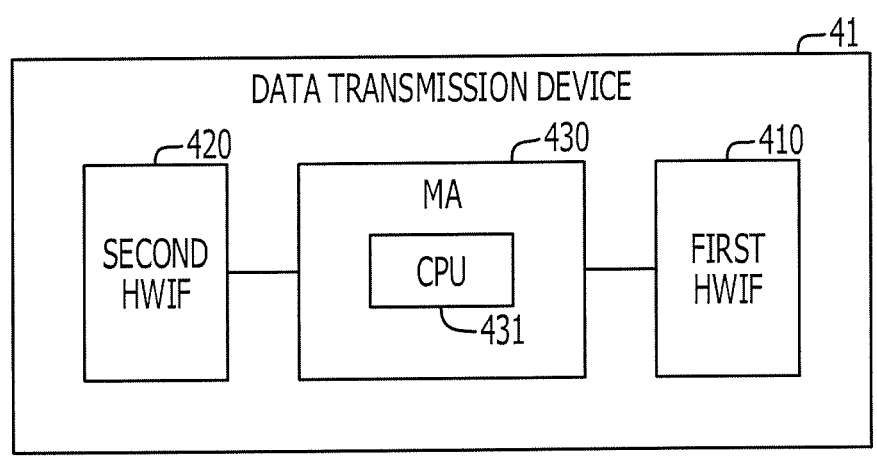
FIG. 5 is a diagram illustrating an exemplary configuration of a data transmission device of the first embodiment.

As illustrated in FIG. 5, the data transmission device 41 includes a first HWIF 410, a second HWIF 420 and a Mobility Anchoring (MA) 430. The MA 430 is equipped with a CPU 431.

The first HWIF 410 is connected to the second communication network NW2. The first HWIF 410 is an interface for communicating with the access control device 31 connected to the second communication network NW2.

The second HWIF 420 is connected to the second communication network NW2 as is the first HWIF 410. The second HWIF 420 is an interface for communicating with other nodes (for example, a device forming a Packet Gateway (P-GW) not illustrated) connected to the second communication network NW2.

The MA 430 manages the mobility of the user terminals 11. For example, the MA 430 manages the handover between the wireless base stations 21 while managing the locations of the user terminals 11.

The data transmission device 41 transmits, for each area allocated to each wireless base station 21, data for the area (that is, data associated with the area) to the wireless base station 21. In the present embodiment, the area corresponds to a sector and may well be a cell.

The management device 42 is configured to be able to perform a reset operation for a relay device (for example, a router or a switch, which is not illustrated) which relays the communication between the access control device 31 and the data transmission device 41. In the present embodiment, the reset operation changes the state of the relay device to discard data and commands or the like that invited an abnormal state (for example, returns the relay device to an initial setting state), and then restarts the relay device.

Functions

Figure 6:
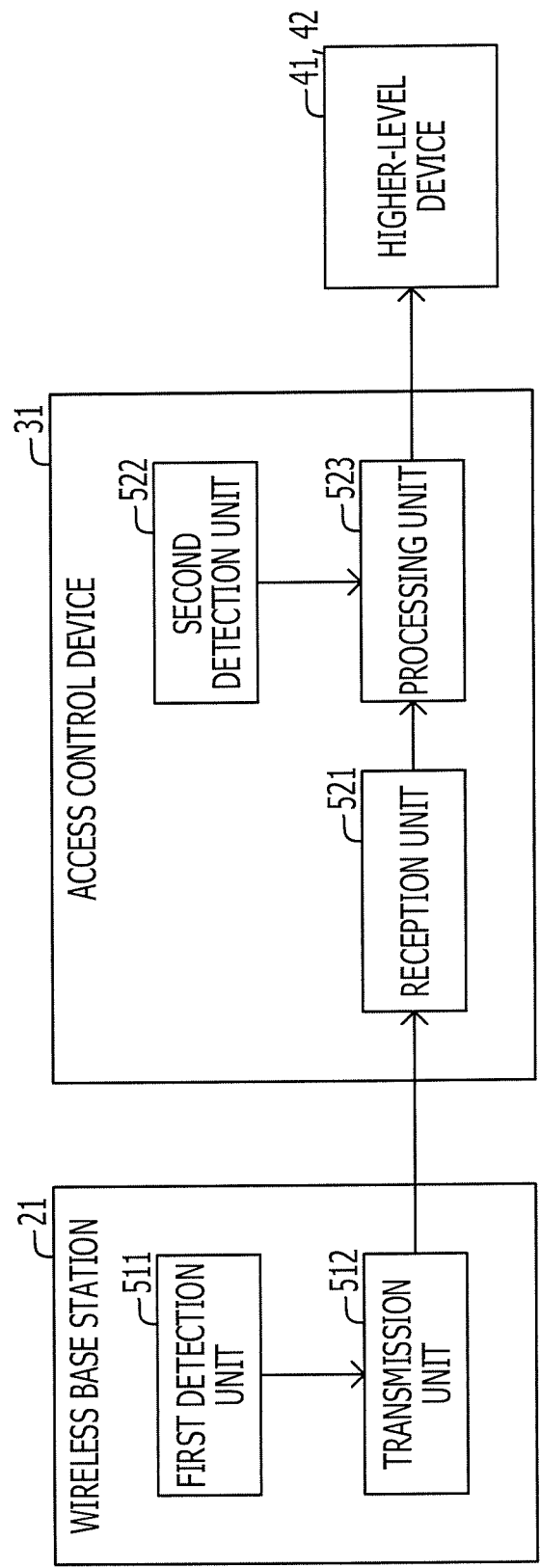
FIG. 6 is a diagram illustrating exemplary functions of the wireless communication system of the first embodiment.

FIG. 6 is a block diagram illustrating at least some of the functions of the wireless communication system 1 configured as described above. The functions of the wireless base station 21 include a first detection unit 511 and a transmission unit 512. The functions of the access control device 31 include a reception unit 521, a second detection unit 522 and a processing unit 523.

The first detection unit 511 detects each of plural types of abnormalities that occurred at the downstream side of the access control device 31. In the present embodiment, the types of abnormalities detected by the first detection unit 511 include a flow rate abnormality type of base station, a flow rate abnormality type in each area, a first communication abnormality type and a second communication abnormality type. The types of abnormalities detected by the first detection unit 511 may be a portion of the flow rate abnormality type of base station, the flow rate abnormality type in each area, the first communication abnormality type and the second communication abnormality type.

The flow rate abnormality type of base station is a type of abnormality indicating that the reception data flow rate of base station is a predetermined threshold value for abnormality of base station or more. Here, the reception data flow rate of base station is an amount of data (in the present embodiment, a total amount of data for all areas) received per unit time by a wireless base station 21 from the data transmission device 41. The abnormality pertaining to the flow rate abnormality type of base station is also called a flow rate abnormality of base station.

The flow rate abnormality type in each area is an abnormality type indicating that a reception data flow rate for any one of areas is a predetermined threshold value for abnormality in each area or more. Here, the reception data flow rate in each area is an amount of data for each area received per unit time by a wireless base station 21 from the data transmission device 41. The abnormality pertaining to the flow rate abnormality type in each area is also called a flow rate abnormality in each area.

The first communication abnormality type is an abnormality type which corresponds to an abnormality in communications between a wireless base station 21 and a user terminal 11 (first communication section). Here, the abnormality in communications is an abnormality in the communication quality in the first communication section. Specifically, the parameters (communication quality parameters) indicating the communication quality include, for example, an Acknowledgement (ACK) rate, an error rate and a Signal to Noise Ratio (SNR).

For example, the ACK rate is a ratio of the number of received ACKs to the sum of the number of received ACKs and the number of received Negative Acknowledgements (NACKs). The error rate may be, for example, a Bit Error Ratio (BER), a Block Error Ratio (BLER), a Frame Error Ratio (FER), a Packet Error Ratio (PER) or a Symbol Error Ratio (SER).

The ACK rate and the error rate may be measured by a predetermined function such as, for example, Radio Resource Control (RRC).

In the present embodiment, the abnormality of communication quality is an abnormality that the communication quality parameter for the first communication section satisfies a predetermined first communication abnormality condition. In the present embodiment, the fact that at least one of a first element condition indicating that the ACK rate is a predetermined threshold value or less, a second element condition indicating that the error rate is a predetermined threshold value or more, and a third element condition indicating that the SNR is a predetermined threshold value or less is satisfied corresponds to the fact that the communication quality parameter satisfies the first communication abnormality condition. The fact that two or more element conditions are satisfied may correspond to the fact that the communication quality parameter satisfies the first communication abnormality condition. An abnormality pertaining to the first communication abnormality type is also called a first communication abnormality.

The second communication abnormality type is an abnormality type which corresponds to an abnormality in communications between a wireless base station 21 and the access control device 31 (second communication section). Here, the abnormality in communications includes the abnormality of the communication quality in the second communication section and the abnormality in communication network (the first communication network NW1). The communication quality parameters for the second communication section include, for example, the ACK rate and the error rate.

Here, the abnormality of communication quality is an abnormality that the communication quality parameter for the second communication section satisfies a predetermined second communication abnormality condition. In the present embodiment, the fact that at least one of a first element condition indicating that the ACK rate is a predetermined threshold value or less and a second element condition indicating that the error rate is a predetermined threshold value or more corresponds to a fact that the communication quality parameter satisfies the second communication abnormality condition. The fact that all of the element conditions are satisfied may correspond to the fact that the communication quality parameter satisfies the second communication abnormality condition.

The abnormality in communication network corresponds to an abnormality indicating that an occurrence rate of abnormal packets is a predetermined threshold value for occurrence rate or more. Here, the occurrence rate of abnormal packets is a ratio of the number of abnormal packets received per unit time to the number of packets received per unit time.

For example, the abnormal packets correspond to the packets pertaining to, for example, the following (1), (2), (3), (4) packets:

(1) Packets for which an address different from the address assigned to the wireless base station 21 is set as a destination address (for example, Medium Access Control (MAC) address of a destination);

(2) Packets having a header field or a tag field which stores data of different size from a predetermined size of the corresponding field;

(3) Packets having a header field or a tag field which stores data having a different value from a predetermined value of the corresponding field; and (4) Packets having data divided into plural pieces and impossible to be restored to a state before the division.

An abnormality pertaining to the second communication abnormality type is also called a second communication abnormality.

Specifically, the first detection unit 511 acquires parameters (abnormality detection parameters) for detecting each of the plural types of abnormalities. In the present embodiment, the abnormality detection parameters include the reception data flow rate of base station, the reception data flow rate in each area, the communication quality parameter for the first communication section, the communication quality parameter for the second communication section and the occurrence rate of the abnormal packets. The first detection unit 511 detects each of the plural types of abnormalities based on the acquired abnormality detection parameters.

When a session according to the PPP is established between the transmission unit 512 and the access control device 31, the transmission unit 512 transmits a notification signal to the access control device 31 each time when a prescribed transmission period elapses. In the present embodiment, the notification signal is an Echo Request message. The notification signal may be a message other than the Echo Request message.

Figure 7:
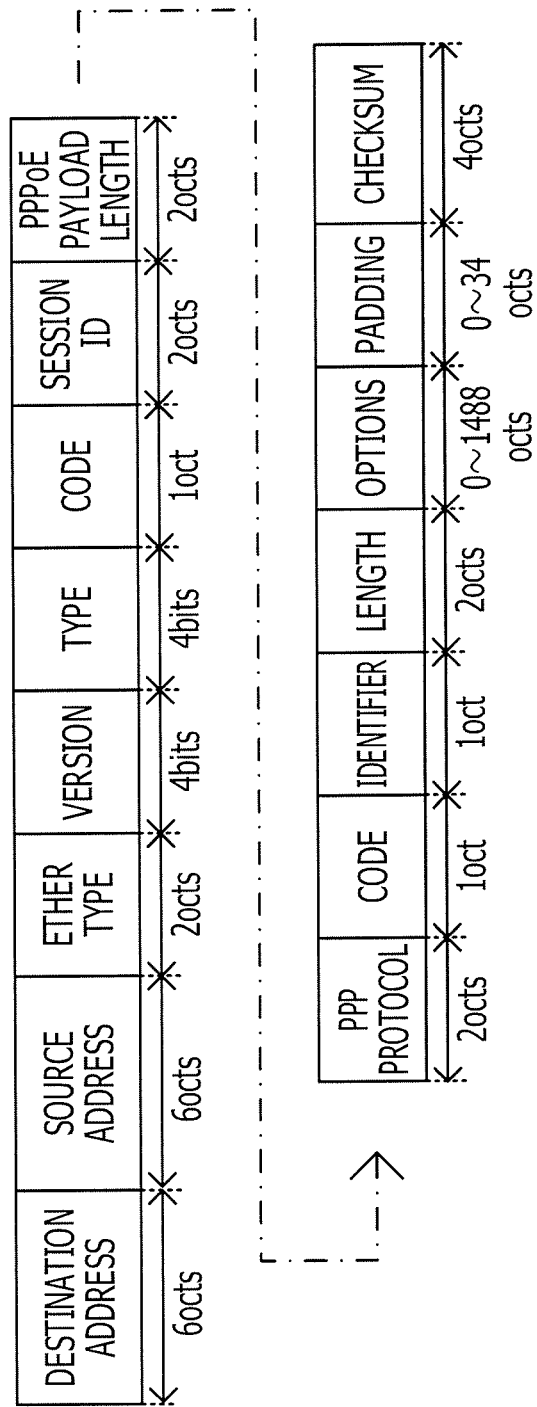
FIG. 7 is a diagram illustrating an exemplary packet according to PPP in the first embodiment.

In the present embodiment, the notification signal is a packet according to the PPP as illustrated in FIG. 7. The notification signal includes a Link Quality Report (LQR) defined by the PPP. The LQR is stored in "Options" field illustrated in FIG. 7. The LQR is specified in a Request for Comments (RFC) 1989.

Figure 8:
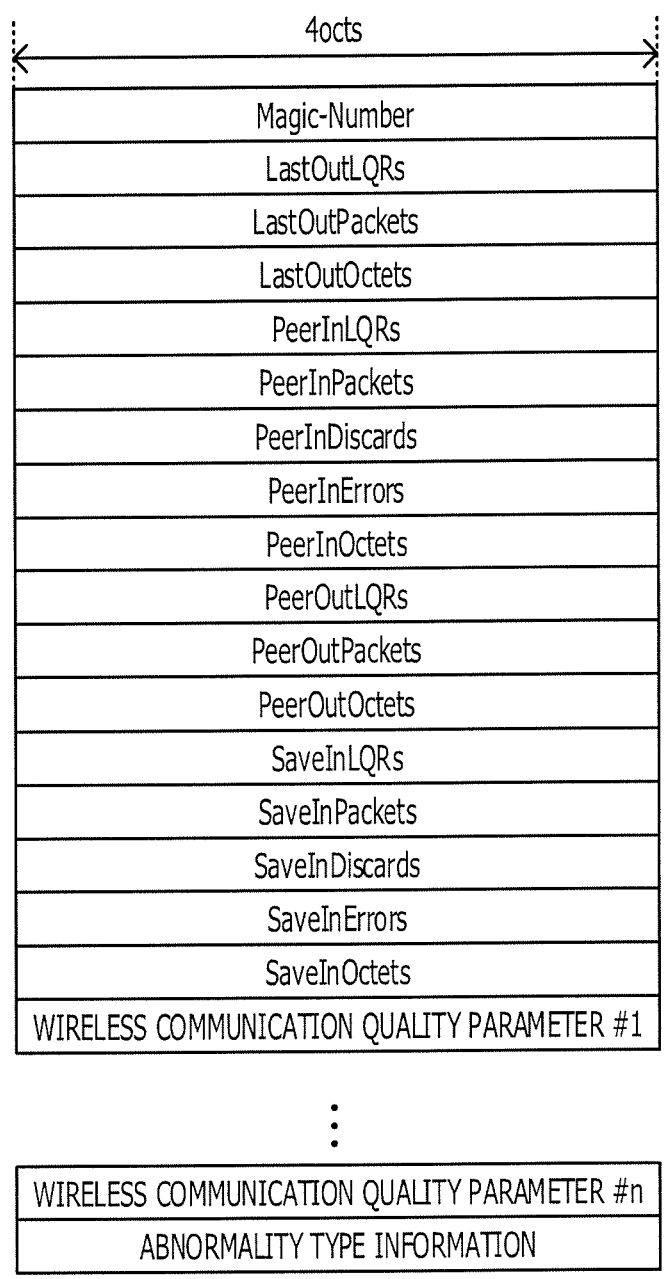
FIG. 8 is a diagram illustrating an exemplary LQR in the first embodiment.

The LQR includes fields ranging from "Magic-Number" field to "SaveInOctets" field, fields ranging from "wireless communication quality parameter #1" field to "wireless communication quality parameter #n" field, and "abnormality type information" field as illustrated in FIG. 8.

In the fields ranging from "Magic-Number" field to "SaveInOctets" field, pieces of information are stored that indicate, for example, the number of transmitted and received packets, the number of discarded packets and the number of received abnormal packets in communication between the wireless base station 21 and the access control device 31.

In the fields ranging from "wireless communication quality parameter #1" field to "wireless communication quality parameter #n" field, pieces of information are stored that indicate, for example, the number of transmitted and received packets, the number of discarded packets and the number of received abnormal packets in communication between the wireless base station 21 and the user terminals 11.

In the "abnormality type information" field, information that indicates the type of abnormalities detected by the first detection unit 511 is stored. The information indicating the detected type of abnormalities also indicates that some type of abnormality is detected. When no abnormality is detected by the first detection unit 511, information indicating that no abnormality is detected is stored in the "abnormality type information" field.

That is, the notification signal includes information (abnormality type information) indicating the detected type of abnormality. The notification signal may include the abnormality type information as information other than the LQR.

In the present embodiment, among the functions of the first detection unit 511, the function of acquiring the parameter indicating the quality of communication between the wireless base station 21 and the user terminals 11 is performed by the BB 242. Among the functions of the first detection unit 511, the function of acquiring the parameter indicating the quality of communication between the access control device 31 and the wireless base station 21, and the functions of acquiring the reception data flow rate of base station, the reception data flow rate in each area and the occurrence rate of abnormal packets are performed by the HWIF 252. The function, among the functions of the first detection unit 511, of detecting the abnormality and the functions of the transmission unit 512 are performed by the CPU 254.

The reception unit 521 receives the notification signal transmitted by the wireless base station 21 (specifically, by the transmission unit 512).

The second detection unit 522 detects each of at least one abnormality occurred at the upstream side of the access control device 31 based on signals transmitted by a higher level device (here, the data transmission device 41) connected to the second communication network NW2. In the present embodiment, the type of abnormality detected by the second detection unit 522 is a third communication abnormality type.

The third communication abnormality type is an abnormality type which corresponds to an abnormality in communications between the access control device 31 and the data transmission device 41. The abnormality in communication may include an abnormality of communication quality. In this case, it is appropriate for the second detection unit 522 to detect the abnormality based on, for example, the ACK rate and the error rate as in the first detection unit 511. An abnormality pertaining to the third communication abnormality type is also called a third communication abnormality.

In the present embodiment, the second detection unit 522 detects the abnormality pertaining to the third communication abnormality type based on a reception data flow rate of device. Here, the reception data flow rate of device is an amount of data received per unit time by the access control device 31 from the data transmission device 41. When the reception data flow rate of device satisfies a predetermined third communication abnormality condition, the second detection unit 522 detects the abnormality pertaining to the third communication abnormality type.

In the present embodiment, the fact that a predetermined condition indicating that the reception data flow rate of device is a predetermined threshold value or less is satisfied corresponds to the fact that the reception data flow rate of device satisfies the third communication abnormality condition. The fact that a predetermined condition indicating that the reception data flow rate of device is a predetermined threshold value or more is satisfied may correspond to the fact that the reception data flow rate of device satisfies the third communication abnormality condition.

Further, the second detection unit 522 may be configured to detect an abnormality pertaining to the third communication abnormality type when the change rate of the reception data flow rate of device over time is either a predetermined threshold value or less or a predetermined threshold value or more.

The processing unit 523 performs a processing depending on the type of the detected abnormality when an abnormality type information included in the notification signal received by the reception unit 521 indicates that some type of abnormality is detected (at downstream of the access control device 31) by the wireless base station 21. Here, the processing unit 523 determines the type of the detected abnormality based on the abnormality type information.

In the present embodiment, the processing unit 523 transmits information according to the type of detected abnormality to a destination according to the type of detected abnormality. In the present embodiment, the processing unit 523 transmits the information according to a Simple Network Management Protocol (SNMP). The processing unit 523 may be configured to transmit the information according to a protocol scheme other than the SNMP.

Specifically, the processing unit 523 performs a process of transmitting a reduction instruction for base station flow rate to the data transmission device 41 as the destination when the type of the detected abnormality corresponds to the flow rate abnormality type of base station. The reduction instruction for base station flow rate is information for instructing to reduce the transmission data flow rate for base station. The transmission data flow rate for base station corresponds to an amount of data transmitted to a wireless base station 21 per unit time. In the present embodiment, the reduction instruction for base station flow rate includes information for determining a target wireless base station 21 for which the transmission data flow rate is reduced.

Further, the processing unit 523 performs a process of transmitting a reduction instruction for area flow rate to the data transmission device 41 as a destination when the type of the detected abnormality corresponds to the flow rate abnormality type in each area. The reduction instruction for area flow rate is information for instructing to reduce the transmission data flow rate for each area. The transmission data flow rate for each area corresponds to an amount of data for each area transmitted to a wireless base station 21 per unit time. In the present embodiment, the reduction instruction for area flow rate includes information for determining a target wireless base station 21 and a target area for which the transmission data flow rate is reduced.

When an abnormality is detected by the second detection unit 522, the processing unit 523 performs a processing depending on the type of the detected abnormality. Specifically, the processing unit 523 performs a process for transmitting a reset instruction to the management device 42 as the destination when the type of the detected abnormality corresponds to the third communication abnormality type. The reset instruction is information for instructing to reset the relay device. Here, as described above, the relay device is a device which relays the communication between the access control device 31 and the data transmission device 41.

The processing unit 523 transmits an abnormality detection notification to the management device 42 as a destination regardless of the type of the detected abnormality. The abnormality detection notification is information for notifying that an abnormality is detected.

In the present embodiment, the functions of the reception unit 521 and the function of acquiring the reception data flow rate of device among the functions of the second detection unit 522 are performed by the PPP processing unit 330. Further, the function of detecting abnormality among the functions of the second detection unit 522 and the functions of the processing unit 523 are performed by the CPU 340.

The functions of the data transmission device 41 include a transmission unit which transmits data to the wireless base stations 21. When the reduction instruction for base station flow rate is received from the access control device 31, the transmission unit reduces the amount, per unit time, of data transmitted to the wireless base station 21 specified by the reduction instruction for base station flow rate.

When the reduction instruction for area flow rate is received from the access control device 31, the transmission unit reduces the amount, per unit time, of data for the area specified by the reduction instruction for area flow rate transmitted to the wireless base station 21 specified by the reduction instruction for area flow rate.

The functions of the management device 42 include a management unit which manages the wireless communication system 1. When the reset instruction is received from the access control device 31, the management unit performs a reset operation for the relay device which relays the communication between the access control device 31 and the data transmission device 41. When the abnormality detection notification is received from the access control device 31, the management unit stores the abnormality detection notification in association with the date and time of receipt.

Operations

Figure 9:
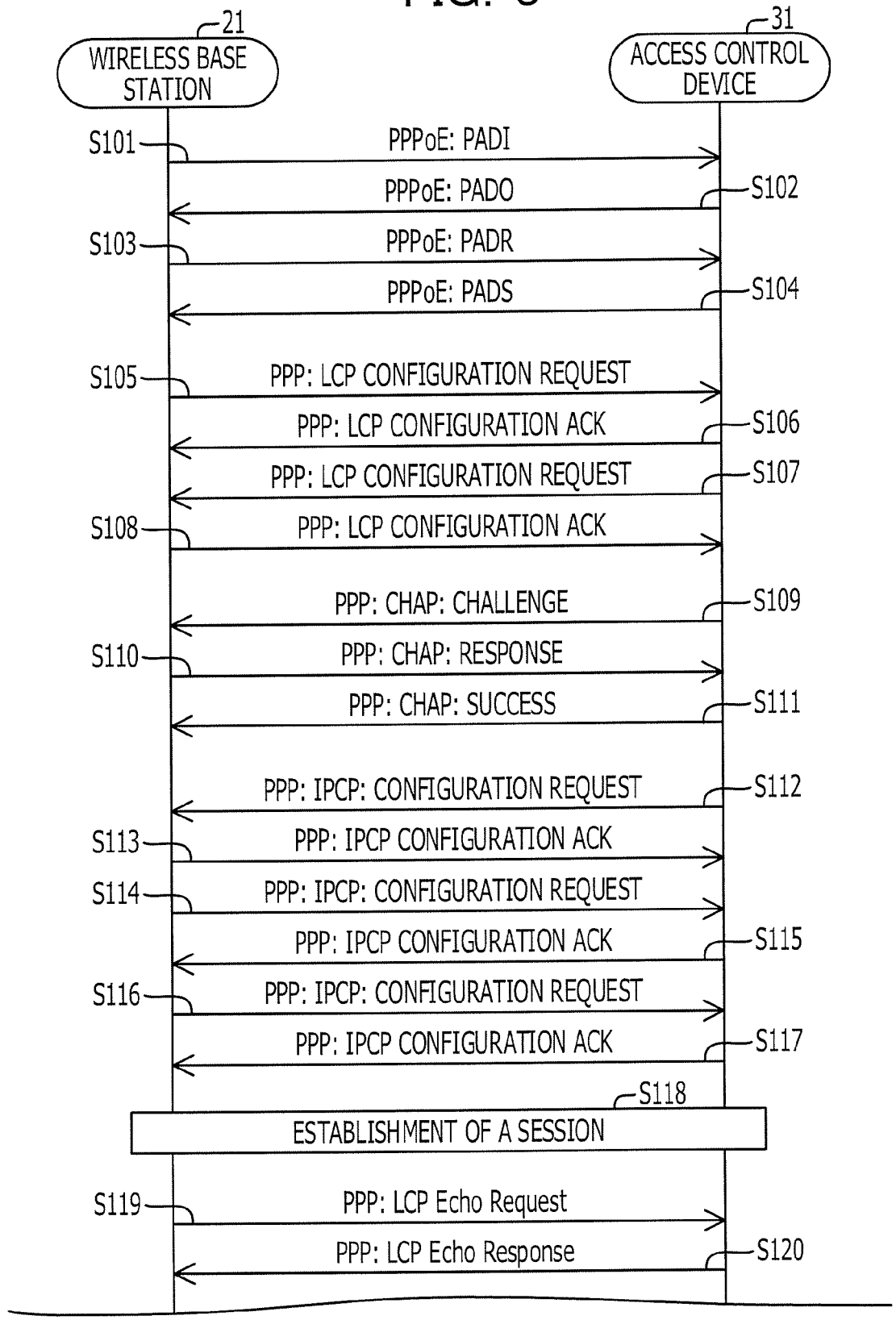
FIG. 9 is a sequence chart illustrating an exemplary operation of the wireless communication system of the first embodiment.
Figure 10:
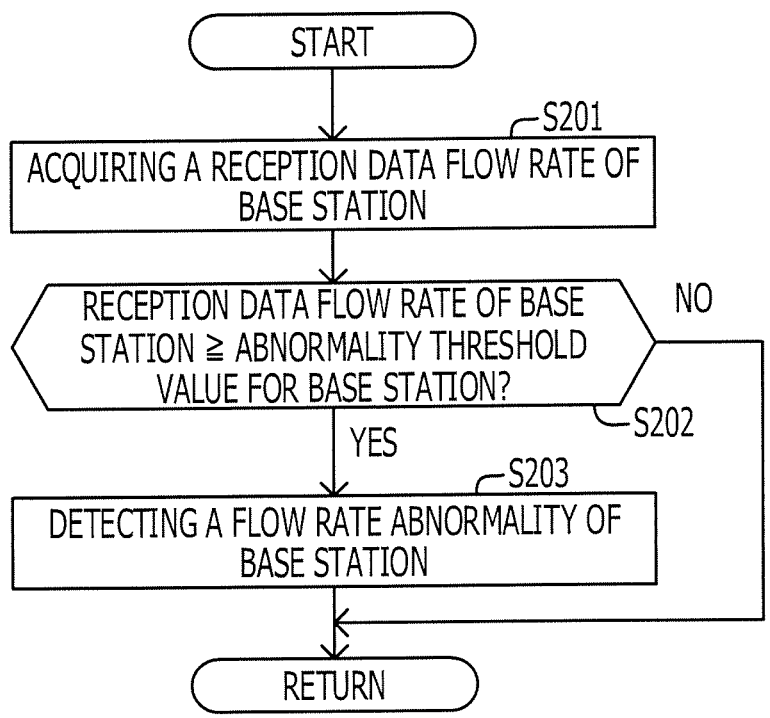
FIG. 10 is a flowchart illustrating an exemplary process of detecting a flow rate abnormality of a base station performed by the base station of the first embodiment.

Next, the operations of the wireless communication system 1 described above will be described. First, the wireless base station 21 establishes a session with the access control device 31 according to the PPP. Specifically, as illustrated in FIG. 9, the wireless base station 21 establishes a PPPoE session according to a PPP over the Ethernet (PPPoE) (S101, S102, S103, S104).

Subsequently, the wireless base station 21 establishes a PPP session through the established PPPoE session (S105 to S118). In this case, the access control device 31 authenticates whether the wireless base station 21 is an authorized base station (S109, S110). When it is determined that the wireless base station 21 is an authorized base station (S111), an IP address is assigned to the wireless base station 21 (S115), and thus, the access control device 31 establishes the session with the wireless base station 21 (S118).

As described above, the access control device 31 authenticates whether the wireless base station 21 is an authorized base station (S109, S110). When it is determined that the wireless base station 21 is not an authorized base station, an IP is not assigned to the wireless base station 21. Accordingly, in this case, a session (PPP session) between the wireless base station 21 and the access control device 31 is not established.

The wireless base station 21 transmits an Echo Request to the access control device 31 each time when a predetermined period elapses while the PPP session is being established (S119). When the Echo Request is received, the access control device 31 transmits the Echo Response to the wireless base station 21 (S120). That is, the processing of S119 and S120 are performed repeatedly each time when the transmission period elapses.

As described above, the Echo Request includes abnormality type information. In the present embodiment, when some type of abnormality is detected, the wireless base station 21 includes abnormality type information indicating the type of detected abnormality in the Echo Request to be transmitted immediately after.

Here, the operation for detecting abnormalities by the wireless base station 21 will be described. The wireless base station 21 performs the process of the flowchart illustrated in FIG. 10 each time when a predetermined detection period elapses.

Specifically, the wireless base station 21 acquires the reception data flow rate of base station (S201). The wireless base station 21 determines whether the acquired reception data flow rate of base station is a predetermined threshold value for abnormality of base station or more (S202). When it is determined that the acquired reception data flow rate of base station is the predetermined threshold value for abnormality of base station or more (Yes in S202), the wireless base station 21 detects the flow rate abnormality of base station (S203). When it is determined that the acquired reception data flow rate of base station is less than the predetermined threshold value for abnormality of base station (No in S202), the wireless base station 21 does not detect the flow rate abnormality of base station.

Figure 11:
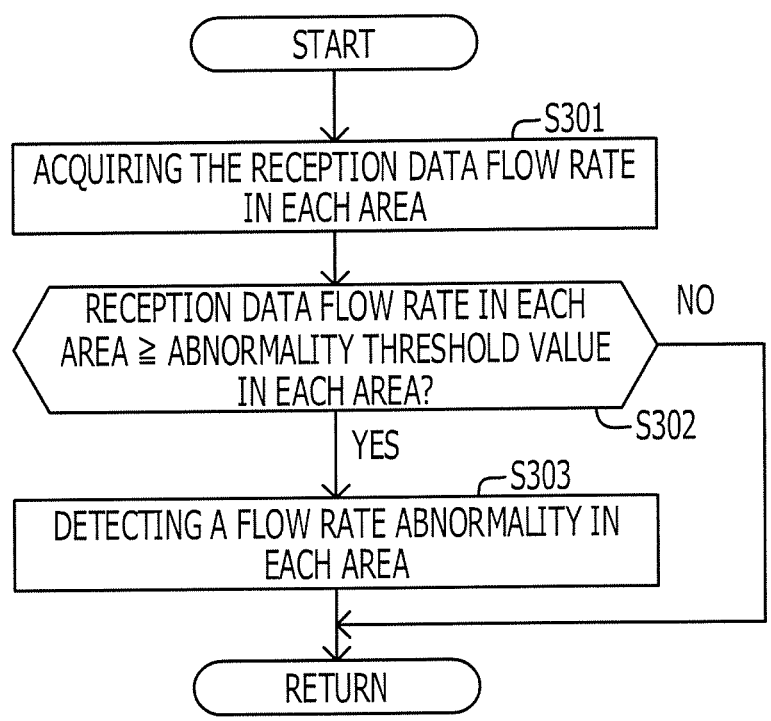
FIG. 11 is a flowchart illustrating an exemplary process of detecting a flow rate abnormality in each area performed by the wireless base station of the first embodiment.

The wireless base station 21 performs the process of the flowchart illustrated in FIG. 11 for each area allocated to the wireless base station 21 independently each time when a predetermined detection period elapses.

Specifically, the wireless base station 21 acquires the reception data flow rate in each area (S301). The wireless base station 21 determines whether the acquired reception data flow rate in each area is a predetermined threshold value for abnormality in each area or more (S302). When it is determined that the acquired reception data flow rate in each area is the predetermined threshold value for abnormality in each area or more (Yes in S302), the wireless base station 21 detects a flow rate abnormality in each area (S303). When it is determined that the acquired reception data flow rate in each area is less than the predetermined threshold value for abnormality in each area (No in S302), the wireless base station 21 does not detect the flow rate abnormality in each area.

Figure 12:
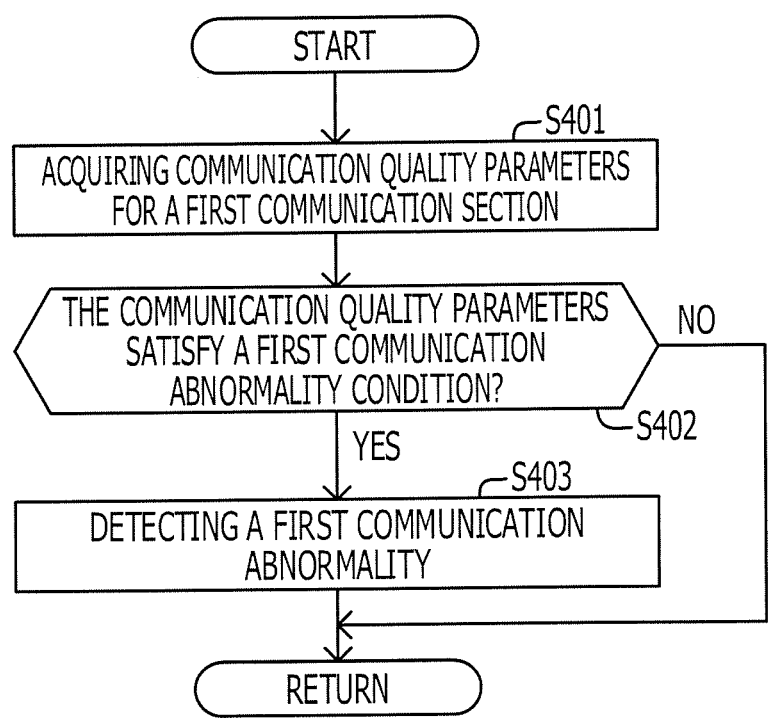
FIG. 12 is a flowchart illustrating an exemplary process of detecting a first communication abnormality performed by the wireless base station of the first embodiment.

The wireless base station 21 performs the process of the flowchart illustrated in FIG. 12 each time when a predetermined detection period elapses.

Specifically, the wireless base station 21 acquires communication quality parameters for a first communication section (S401). The wireless base station 21 determines whether the acquired communication quality parameters satisfy a predetermined first communication abnormality condition (S402). When it is determined that the acquired communication quality parameters satisfy the predetermined first communication abnormality condition (Yes in S402), the wireless base station 21 detects a first communication abnormality (S403). When it is determined that the acquired communication quality parameters does not satisfy the predetermined first communication abnormality condition (No in S402), the wireless base station 21 does not detect the first communication abnormality.

Figure 13:
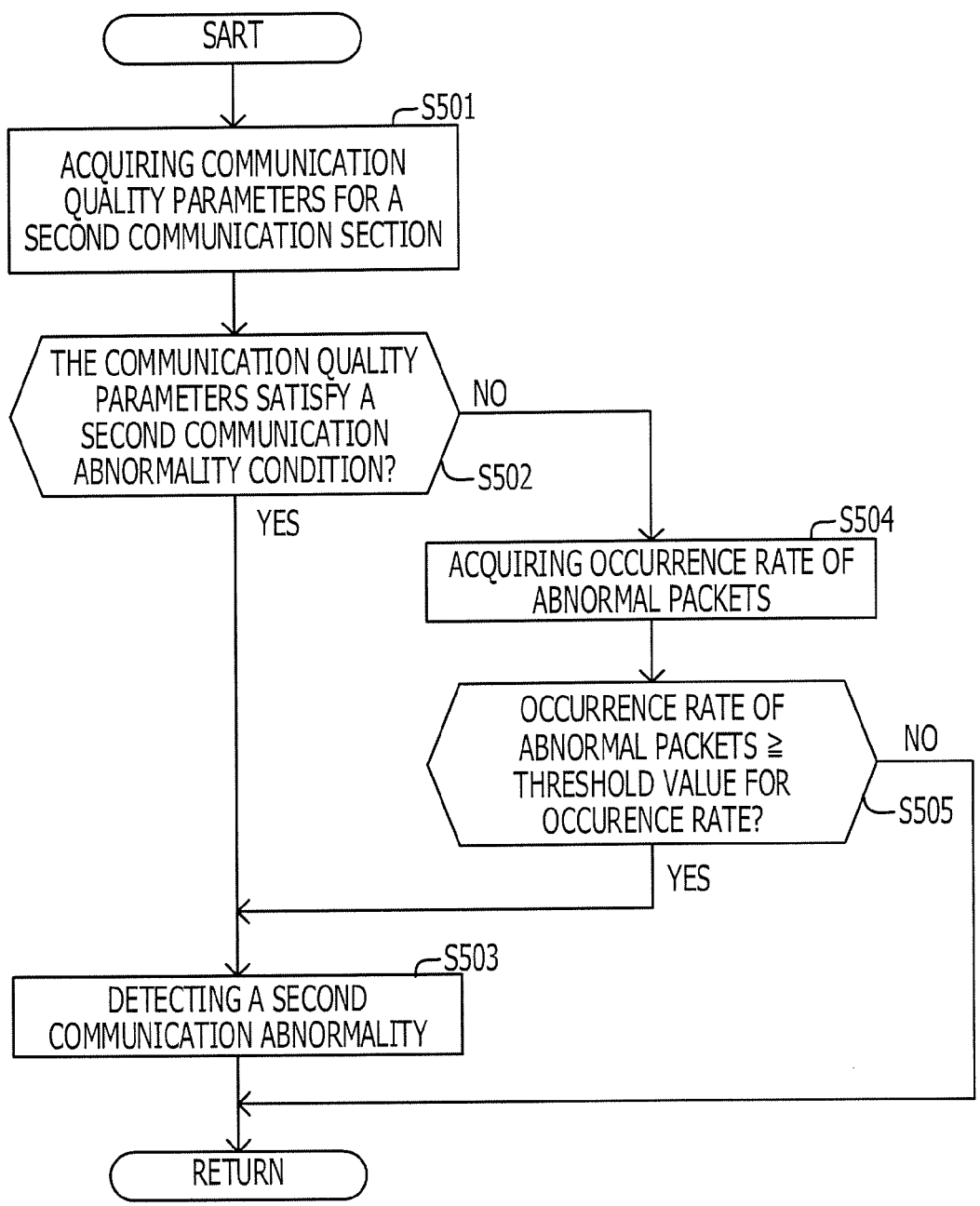
FIG. 13 is a flowchart illustrating an exemplary process of detecting a second communication abnormality performed by the wireless base station of the first embodiment.
Figure 14:
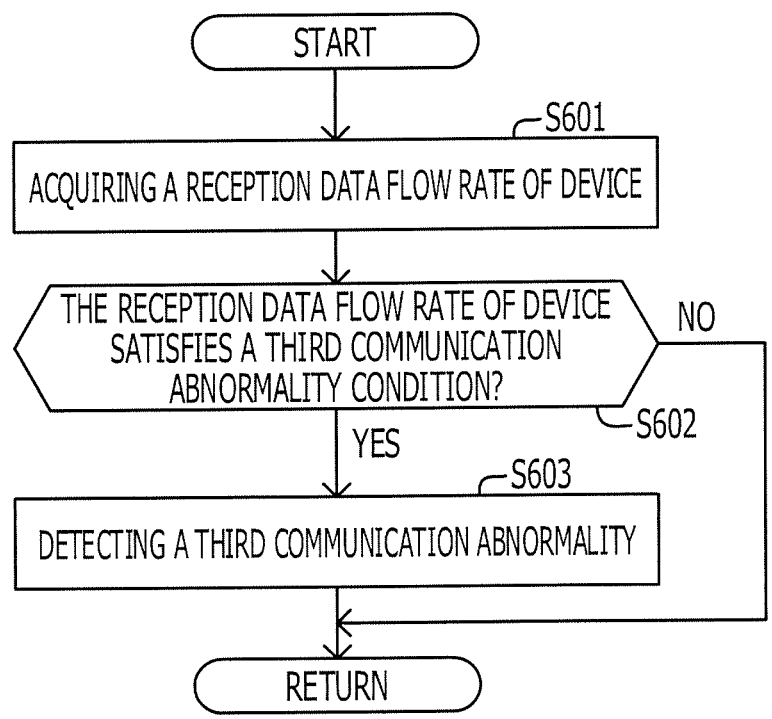
FIG. 14 is a flowchart illustrating an exemplary process of detecting a third communication abnormality performed by the access control device of the first embodiment.

The wireless base station 21 performs the process of the flowchart illustrated in FIG. 13 each time when a predetermined detection period elapses.

Specifically, the wireless base station 21 acquires communication quality parameters for a second communication section (S501). The wireless base station 21 determines whether the acquired communication quality parameters satisfy a predetermined second communication abnormality condition (S502). When it is determined that the acquired communication quality parameters satisfy the predetermined second communication abnormality condition (Yes in S502), the wireless base station 21 detects a second communication abnormality (S503).

When it is determined that the acquired communication quality parameters do not satisfy the predetermined second communication abnormality condition (No in S502), the wireless base station 21 acquires the occurrence rate of abnormal packets (S504). The wireless base station 21 determines whether the acquired occurrence rate of abnormality packets is a predetermined threshold value for occurrence rate or more (S505).

When it is determined that the acquired occurrence rate of abnormality packets is the predetermined threshold value for occurrence rate or more (Yes in S505), the wireless base station 21 detects the second communication abnormality (S503). When it is determined that the acquired occurrence rate of abnormality packets is less than the predetermined threshold value for occurrence rate (No in S505), the wireless base station 21 does not detect the second communication abnormality.

Subsequently, the operations of detecting abnormalities by the access control device 31 will be described. The access control device 31 performs the process of the flowchart illustrated in FIG. 14 each time when a predetermined detection period elapses.

Specifically, the wireless base station 21 acquires the reception data flow rate of device (S601). The wireless base station 21 determines whether the acquired reception data flow rate of device satisfies a predetermined third communication abnormality condition (S602). When it is determined that the acquired reception data flow rate of device satisfies the predetermined third communication abnormality condition (Yes in S602), the wireless base station 21 detects a third communication abnormality (S603). When it is determined that the acquired reception data flow rate of device does not satisfy the third communication abnormality condition (No in S602), the wireless base station 21 does not detect the third communication abnormality.

Subsequently, the operations of performing the processes by the access control device 31 depending on the type of detected abnormality will be described. The access control device 31 performs the process of flowchart illustrated in FIG. 15 for each wireless base station 21 independently each time when the Echo Request is received from each wireless base station 21.

Specifically, the access control device 31 determines whether an abnormality is detected (S701). When abnormality type information included in the Echo Request received immediately before indicates that some type of abnormality is detected or when the third communication abnormality is detected during a period from the previous execution of the process to the current execution of the process, the access control device 31 determines that an abnormality is detected.

First, a case where a third communication abnormality is detected will be described. In this case, it is determined that an abnormality is detected (Yes in S701) and the access control device 31 determines whether the detected abnormality is the third communication abnormality (S702). When it is determined that the detected abnormality is the third communication abnormality (Yes in S702), the access control device 31 transmits a reset instruction to the management device 42 (S706).

According to this, the management device 42 performs a reset operation for the relay device. As a result, it is possible to increase the possibility that the wireless communication system is operated normally. Subsequently, the access control device 31 transmits the abnormality detection notification to the management device 42 (S707). Accordingly, it is possible to reduce the time required until the management device 42 detects the occurrence of abnormality.

Subsequently, a case where the flow rate abnormality in each area is detected will be described. In this case, it is determined that an abnormality is detected (Yes in S701) and that the detected abnormality is not the third communication abnormality (No in S702). Then, the access control device 31 determines whether the detected abnormality is the flow rate abnormality in each area (S703). When it is determined that the detected abnormality is the flow rate abnormality in each area (Yes in S703), the access control device 31 transmits a reduction instruction for area flow rate to the data transmission device 41 (S704).

According to this, the data transmission device 41 reduces the transmission data flow rate for each area. As a result, it is possible to reduce the reception data flow rate in each area of the wireless base station 21. Therefore, it is possible to increase the possibility that the wireless communication system 1 is operated normally. Subsequently, the access control device 31 transmits the abnormality detection notification to the management device 42 (S707).

Subsequently, a case where the flow rate abnormality of base station is detected will be described. In this case, it is determined that an abnormality is detected (Yes in S701), that the detected abnormality is not the third communication abnormality (No in S702) and that the detected abnormality is not the flow rate abnormality in each area (No in S703). Then, the access control device 31 transmits a reduction instruction for the base station flow rate to the data transmission device 41 (S705).

According to this, the data transmission device 41 reduces the transmission data flow rate for base station. As a result, it is possible to reduce the reception data flow rate of base station in the wireless base station 21. Therefore, it is possible to increase the possibility that the wireless communication system 1 is operated normally. Subsequently, the access control device 31 transmits the abnormality detection notification to the management device 42 (S707).

Subsequently, a case where the first communication abnormality or the second communication abnormality is detected will be described. In this case, the access control device 31 operates similarly to the case where the flow rate abnormality of base station is detected. That is, the access control device 31 transmits the reduction instruction for base station flow rate to the data transmission device 41 (S705) and then, transmits the abnormality detection notification to the management device 42 (S707).

Figure 15:
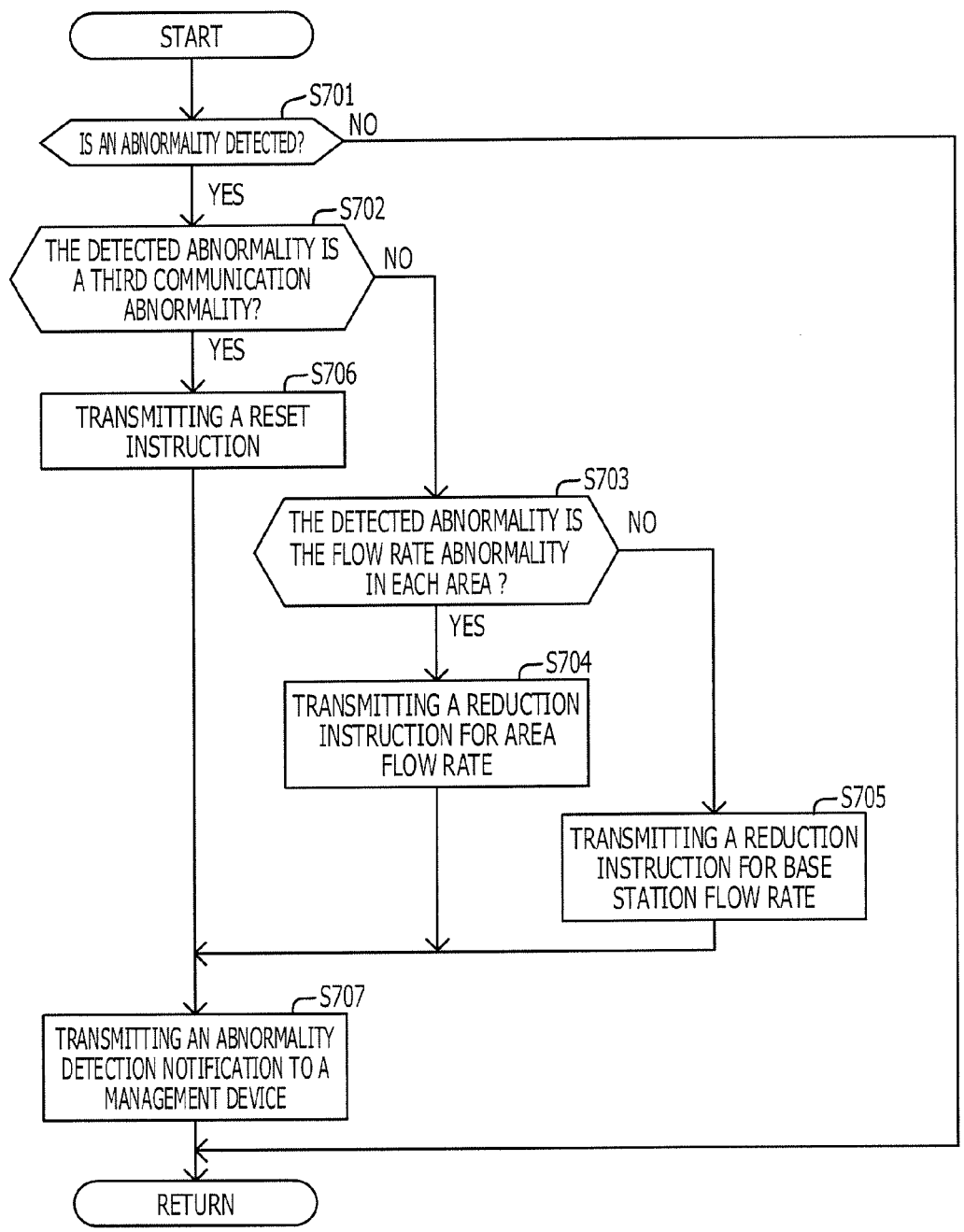
FIG. 15 is a flowchart illustrating an exemplary process performed depending on the type of detected abnormality by the access control device of the first embodiment.

When no abnormality is detected (No in S701), the access control does not perform S702 to S707, and the process of FIG. 15 ends.

As described above, in the wireless communication system 1 according to the first embodiment, the access control device 31 includes a reception unit 521 which receives signals transmitted from the wireless base stations 21 and a processing unit 523 which performs a processing depending on the type of abnormality, among plural types of abnormalities, which has occurred at the downstream side of the access control device 31 and is determined based on the received signals.

According to this, the access control device 31 may perform the processing depending on the type of abnormality that has occurred. As a result, the wireless communication system 1 may perform adequate control for the abnormality that has occurred. That is, it is possible to efficiently cope with the abnormality that has occurred.

Further, in the wireless communication system 1 according to the first embodiment, the processing unit 523 is configured to transmit information according to the type of occurred abnormality to a destination according to the type of occurred abnormality.

According to this, information according to the type of occurred abnormality is transmitted to the destination according to the type of occurred abnormality. As a result, for example, the wireless base station 21 or the higher level devices 41, 42 connected to the second communication network NW2 is able to perform a control according to the received information.

According to the first embodiment, the access control device 31 is configured to establish sessions with the wireless base stations according to the PPP in the wireless communication system 1. Also, the wireless base stations 21 are configured to access the second communication network NW2 through the established sessions. Additionally, the wireless base stations 21 are configured to transmit the signals including the LQR defined by the PPP.

According to this, it is possible to readily implement both the access control by the access control device 31 and the transmission of the signals by the wireless base stations 21.

In the wireless communication system 1 according to the first embodiment, the access control device 31 includes the second detection unit 522 which detects each of at least one type of abnormalities based on the signals transmitted by the higher level devices 41, 42 connected to the higher level network NW2. The processing unit 523 is configured to perform the processing depending on the type of detected abnormality when the abnormality is detected by the second detection unit 522.

According to this, it is possible to perform the processing depending on the type of occurred abnormality even when an abnormality has occurred at any one of the downstream side (the wireless base stations 21) of the access control device 31 and the upstream side (the second communication network NW2 side) of the access control device 31.

In the wireless communication system 1 according to the first embodiment, the second detection unit 522 is configured such that the access control device 31 detects the abnormality in the communication between the access control device 31 and the data transmission device 41 based on the reception data flow rate of device which corresponds to an amount of data received by the access control device 31 per unit time from the data transmission device 41.

When a plurality of higher level devices are connected to the second communication network NW2, the respective higher level devices are often managed by different managers (e.g. mobile communication service providers). Therefore, it may be difficult to request each of the higher level devices to transmit information which indicates the quality of communication conforming to the same format. Even in this case, the wireless communication system 1 configured as described above may easily detect an abnormality in the communication between a higher level device and the access control device 31.

In the first embodiment, the access control device 31 is configured to establish a session with a wireless base station 21 according to the PPP, but may be configured to establish the session with the wireless base station according to another protocol scheme other than the PPP.

The wireless base station 21 and the access control device 31 adopt the same detection period regardless of the type of abnormality as a period for performing of detecting the abnormality in the first embodiment, but may adopt different periods for each type of abnormality.

When the first communication abnormality is detected in the first embodiment, the access control device 31 is configured to transmit the reduction instruction for base station flow rate to the data transmission device 41 but may be configured not to transmit the reduction instruction for base station flow rate.

When some type of abnormality is detected in the first embodiment, the access control device 31 is configured to transmit the abnormality detection notification to the management device 42 but may also be configured not to transmit the abnormality detection notification. Furthermore, the access control device 31 may be configured to transmit the abnormality detection notification to the management device 42 only when the type of detected abnormality corresponds to a predetermined type of abnormality.

When the second communication abnormality is detected in the first embodiment, the access control device 31 may be configured to transmit the reset instruction to a device which is able to perform a reset operation for the relay device which relays the communication between the wireless base stations 21 and the access control device 31. Further, when the second communication abnormality is detected, the access control device 31 may be configured to perform the reset operation for the relay device which relays the communication between the wireless base stations 21 and the access control device 31.

Each of the wireless base stations 21 and the access control device 31 may be configured to detect the abnormality (for example, a hardware failure) of its own in the first embodiment.

In the first embodiment, the wireless communication system 1 may be configured to perform processing depending on the type of abnormality only when the abnormalities are detected repeatedly for a predetermined times.

In the first embodiment, a processing sequence to be performed may be changed. For example, in the process of FIGS. 13, S501 and S502 may be performed after S504 and S505. Further, in the process of FIGS. 15, S702 and S706 may be performed after S703 and S704.

Second Embodiment

Subsequently, a wireless communication system according to a second embodiment will be described. The wireless communication system according to the second embodiment is different from the first embodiment in that the access control device also detects the abnormalities that have occurred at the downstream side of the access control device. Hereinafter, descriptions will be made using the differences as the basis.

Functions

Figure 16:
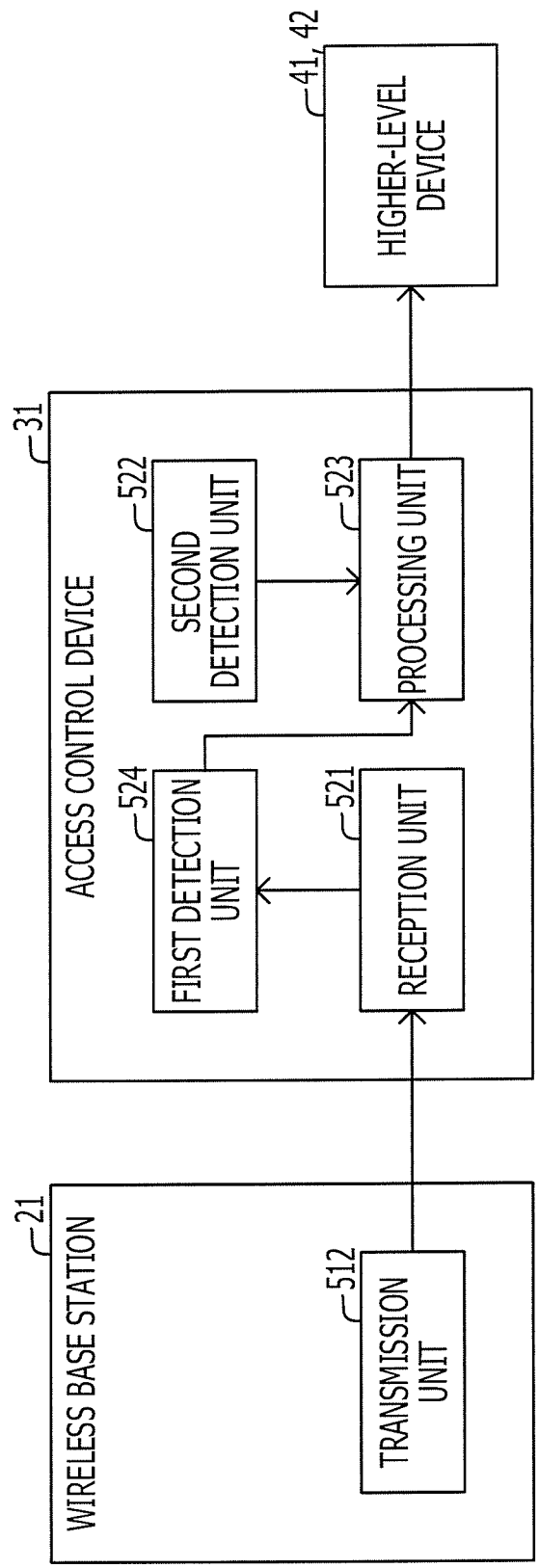
FIG. 16 is a diagram illustrating exemplary functions of a wireless communication system of a second embodiment.

As illustrated in FIG. 16, the functions of the wireless base station 21 according to the second embodiment correspond to the functions of the wireless base station 21 according to the first embodiment except that the first detection unit 511 is removed. Further, the transmission unit 512 according to the second embodiment acquires parameters (abnormality detection parameters) for detecting each of the plural types of abnormalities. The transmission unit 512 transmits a notification signal indicating the acquired abnormality detection parameters to the access control device 31.

In the present embodiment, the abnormality detection parameters include reception data flow rate of base station, the reception data flow rate in each area, a communication quality parameter for the first communication section, a communication quality parameter for the second communication section and an occurrence rate of abnormality packets. That is, the transmission unit 512 creates an Echo Request in such a manner that the LQR includes the abnormality detection parameters, and transmits the created Echo Request to the access control device 31.

Figure 17:
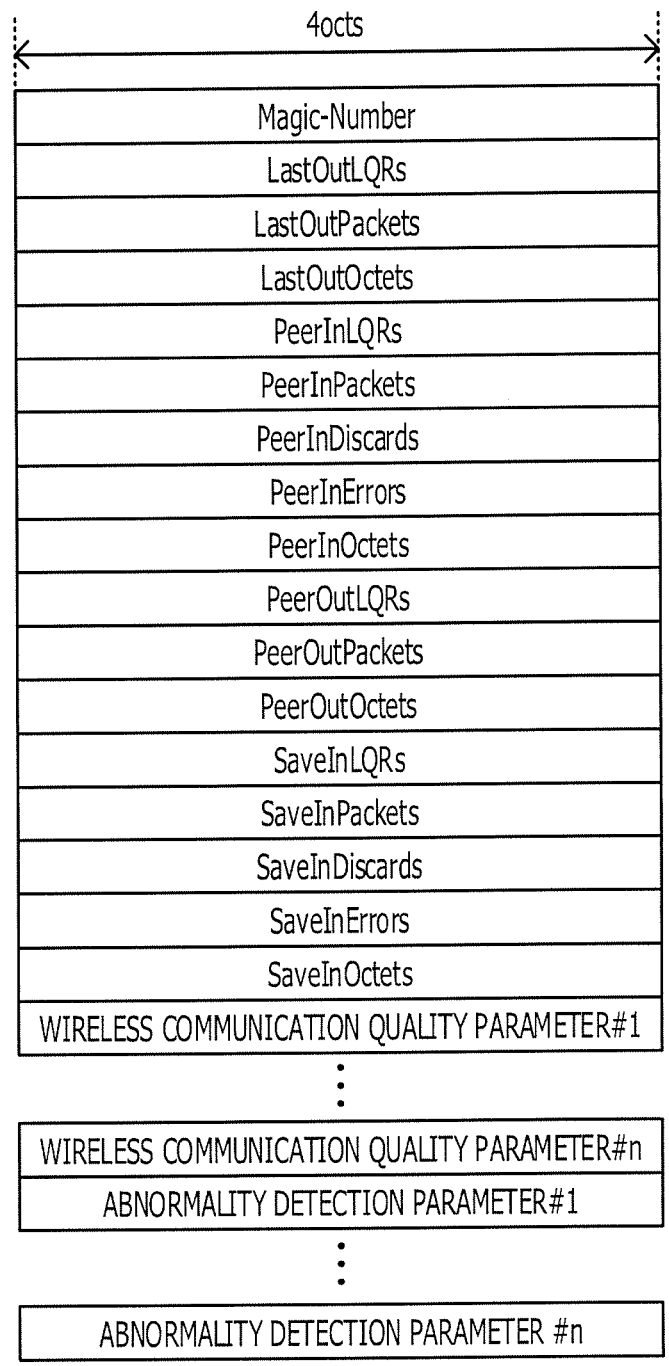
FIG. 17 is a diagram illustrating an exemplary LQR in the second embodiment.
Figure 18:
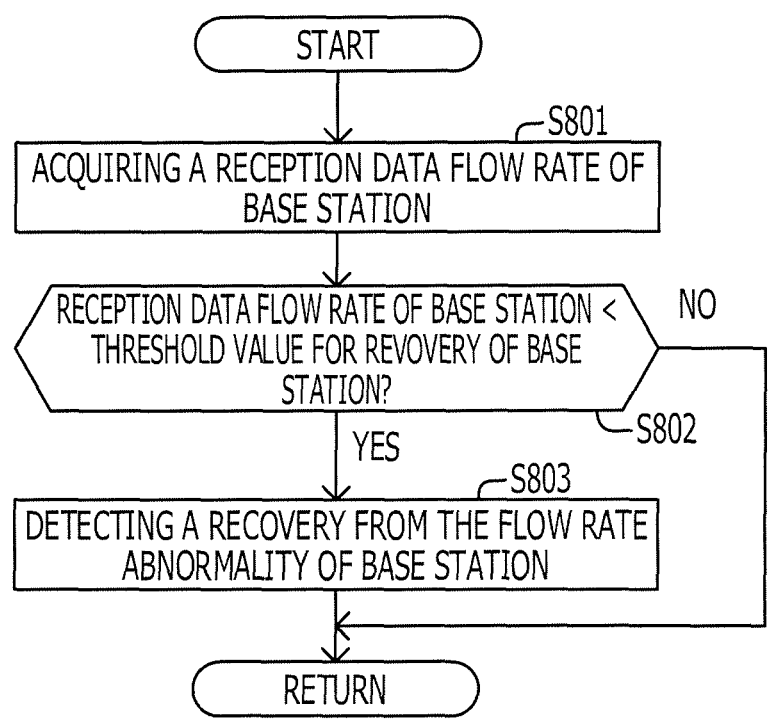
FIG. 18 is a flowchart illustrating an exemplary process of detecting recovery of a wireless base station of a third embodiment from flow rate abnormality of a base station.

In the present embodiment, the LQR includes fields ranging from "Magic-Number" field to "SaveInOctets" field, fields ranging from "wireless communication quality parameter #1" field to "wireless communication quality parameter #n" field, and fields ranging from "abnormality detection parameter #1" field to "abnormality detection parameter #n" field as illustrated in FIG. 17.

The abnormality detection parameters are stored in the fields ranging from "abnormality detection parameter #1" field to "abnormality detection parameter #n" field. Therefore, in the present embodiment, the LQR does not include abnormality type information.

Further, as illustrated in FIG. 16, the functions of the access control device 31 according to the second embodiment correspond to the functions of the access control device 31 according to the first embodiment except that the first detection unit 524 is added. The first detection unit 524 detects each of the plural types of abnormalities based on the Echo Request received by the reception unit 521. Specifically, the first detection unit 524 detects each of the plural types of abnormalities, as in the first detection unit 511 according to the first embodiment, based on the parameters for detecting abnormalities included in the Echo Request.

As described above, the wireless communication system 1 according to the second embodiment is able to achieve similar action or effect as in the wireless communication system 1 according to the first embodiment.

Third Embodiment

Subsequently, a wireless communication system according to a third embodiment will be described. The wireless communication system according to the third embodiment is different from the first embodiment in that the recovery from the abnormality that has occurred is detected. Hereinafter, descriptions will be made using the differences as the basis.

Functions

In FIG. 6, the first detection unit 511 according to the third embodiment detects the recovery from each of the plural types of abnormalities occurred at the downstream side of the access control device 31. In the present embodiment, types of abnormalities, the recoveries from which are detected by the first detection unit 511, include the flow rate abnormality type of base station, the flow rate abnormality type in each area, the first communication abnormality type and the second communication abnormality type.

When the reception data flow rate of base station becomes less than the recovery threshold value of base station, the first detection unit 511 detects the recovery from the flow rate abnormality of base station. In the present embodiment, the recovery threshold value of base station is a value less than or equal to the threshold value for abnormality of base station.

Similarly, when the reception data flow rate in an area for which the flow rate abnormality in each area is detected becomes less than the predetermined recovery threshold value in each area, the first detection unit 511 detects the recovery from the flow rate abnormality in each area. In the present embodiment, the recovery threshold value in each area is a value less than or equal to the threshold value for abnormality in each area.

Similarly, when the communication quality parameter for the first communication section satisfies a predetermined first communication recovery condition, the first detection unit 511 detects the recovery from the first communication abnormality. In the present embodiment, a fact that the ACK rate is a predetermined threshold value or more, the error rate is a predetermined threshold value or less, and the SNR is a predetermined threshold value or more corresponds to the fact that the communication quality parameter satisfies the first communication recovery condition.

Similarly, when the communication quality parameter for the second communication section satisfies a predetermined second communication recovery condition as well as the occurrence rate of abnormality packets is less than a predetermined threshold value for occurrence rate, the first detection unit 511 detects the recovery from the second communication abnormality. In the present embodiment, the fact that the ACK rate is a predetermined threshold value or more and the error rate is a predetermined threshold value or less corresponds to the fact that the communication quality parameter satisfies the second communication recovery condition.

The transmission unit 512 according to the third embodiment creates the Echo Request in such a manner that the LQR further includes recovery type information, and transmits the created Echo Request to the access control device 31. The recovery type information contains information indicating the type of an abnormality (type of recovery), the recovery from which has been detected by the first detection unit 511. Information indicating the detected recovery type also indicates that some type of recovery is detected. Further, when the first detection unit 511 does not detect any type of recovery, the recovery type information indicates that any type of recovery is not detected.

The second detection unit 522 according to the third embodiment detects the recovery from each of at least one type of abnormalities occurred at the upstream side of the access control device 31. Specifically, when the reception data flow rate of device satisfies a predetermined third communication recovery condition, the second detection unit 522 detects the recovery from a third communication abnormality. In the present embodiment, the fact that the reception data flow rate of device is larger than a predetermined flow rate threshold value corresponds to the fact that the reception data flow rate of device satisfies the third communication recovery condition.

In a case where either the recovery type information included in the notification signal received by the reception unit 521 indicates that some type of recovery is detected by the wireless base station 21 (at the downstream side of the access control device 31) or the recovery is detected by the second detection unit 522, the processing unit 523 according to the third embodiment performs a processing depending on the type of detected recovery. Here, the processing unit 523 determines the type of detected recovery based on the recovery type information.

In the present embodiment, the processing unit 523 transmits information according to the type of detected recovery to a destination according to the type of detected recovery.

Specifically, when the detected recovery corresponds to the recovery from the flow rate abnormality of base station, the processing unit 523 performs a process of transmitting an increase instruction for base station flow rate to the data transmission device 41 as a destination. The increase instruction for base station flow rate is information for instructing to increase the transmission data flow rate for base station. In the present embodiment, the increase instruction for base station flow rate includes information for determining a target wireless base station 21 for which the transmission data flow rate is increased.

When the detected recovery corresponds to the recovery from the flow rate abnormality in each area, the processing unit 523 performs a process of transmitting an increase instruction for area flow rate to the data transmission device 41 as a destination. The increase instruction for area flow rate is information for instructing to increase the transmission data flow rate for each area. In the present embodiment, the increase instruction for area flow rate includes information for determining a target wireless base station 21 and a target area for which the transmission data flow rate is increased.

The processing unit 523 transmits a recovery detection notification to the management device 42 as a destination regardless of the type of detected recovery. The recovery detection notification is information for notifying that a recovery from an abnormality is detected.

Operations

Subsequently, the operation of detecting a recovery by the wireless base station 21 will be described. The wireless base station 21 performs a process of flowchart illustrated in FIG. 18 each time when a predetermined detection period elapses.

Specifically, the wireless base station 21 acquires the reception data flow rate of base station (S801). The wireless base station 21 determines whether the acquired reception data flow rate of base station is less than a predetermined threshold value for recovery of base station (S802). When it is determined that the acquired reception data flow rate of base station is less than the predetermined threshold value for recovery of base station (Yes in S802), the wireless base station 21 detects the recovery from the flow rate abnormality of base station (S803). When it is determined that the acquired reception data flow rate of base station is the predetermined threshold value for recovery of base station or more (No in S802), the wireless base station 21 does not detect the recovery from the flow rate abnormality of base station.

Further, the wireless base station 21 performs a processing of detecting a recovery from other types of abnormality in a similar manner. Furthermore, the access control device 31 also performs a processing for detecting a recovery from the third communication abnormality in a similar manner.

Subsequently, the operation of a process depending on the type of detected recovery performed by the access control device 31 will be described. The access control device 31 performs the process of flowchart illustrated in FIG. 19 for each wireless base station 21 independently each time when the Echo Request is received from each wireless base station 21.

Specifically, the access control device 31 determines whether a recovery is detected (S901). When the recovery type information included in the Echo Request received immediately before indicates that some type of recovery is detected or when the recovery from the third communication abnormality is detected during a period from the previous execution of the process to the current execution of the process.

First, a case where a recovery from the flow rate abnormality in each area is detected will be described. In this case, it is determined that a recovery is detected (Yes in S901) and the access control device 31 determines whether the detected recovery is the recovery from the flow rate abnormality in each area (S902). When it is determined that the detected recovery is the recovery from the flow rate abnormality in each area (Yes in S902), the access control device 31 transmits an increase instruction for area flow rate to the data transmission device 41 (S903).

Accordingly, the data transmission device 41 increases the transmission data flow rate for each area. As a result, it is possible to increase the reception data flow rate in each area of the wireless base station 21. Therefore, it is possible to prevent the reception data flow rate in each area from becoming smaller unnecessarily. Subsequently, the access control device 31 transmits the recovery detection notification to the management device 42 (S905).

Subsequently, a case where the recovery from the flow rate abnormality of base station is detected will be described. In this case, that a recovery is detected (Yes in S901) and that the detected recovery is not the recovery from the flow rate abnormality in each area. Then, the access control device 31 transmits an increase instruction for base station flow rate to the data transmission device 41 (S904).

According to this, the data transmission device 41 increases the transmission data flow rate for base station. As a result, it is possible to increase the reception data flow rate of base station in the wireless base station 21. Therefore, it is possible to prevent the reception data flow rate of base station from becoming smaller unnecessarily. Subsequently, the access control device 31 transmits the recovery detection notification to the management device 42 (S905).

Subsequently, a case where the recovery from the first communication abnormality, the second communication abnormality or the third communication abnormality is detected will be described. In this case, the access control device 31 operates in a similar manner to the case where the recovery from the flow rate abnormality of base station is detected. That is, the access control device 31 transmits the increase instruction for base station flow rate to the data transmission device 41 (S904) and then, transmits the recovery detection notification to the management device 42 (S905).

Figure 19:
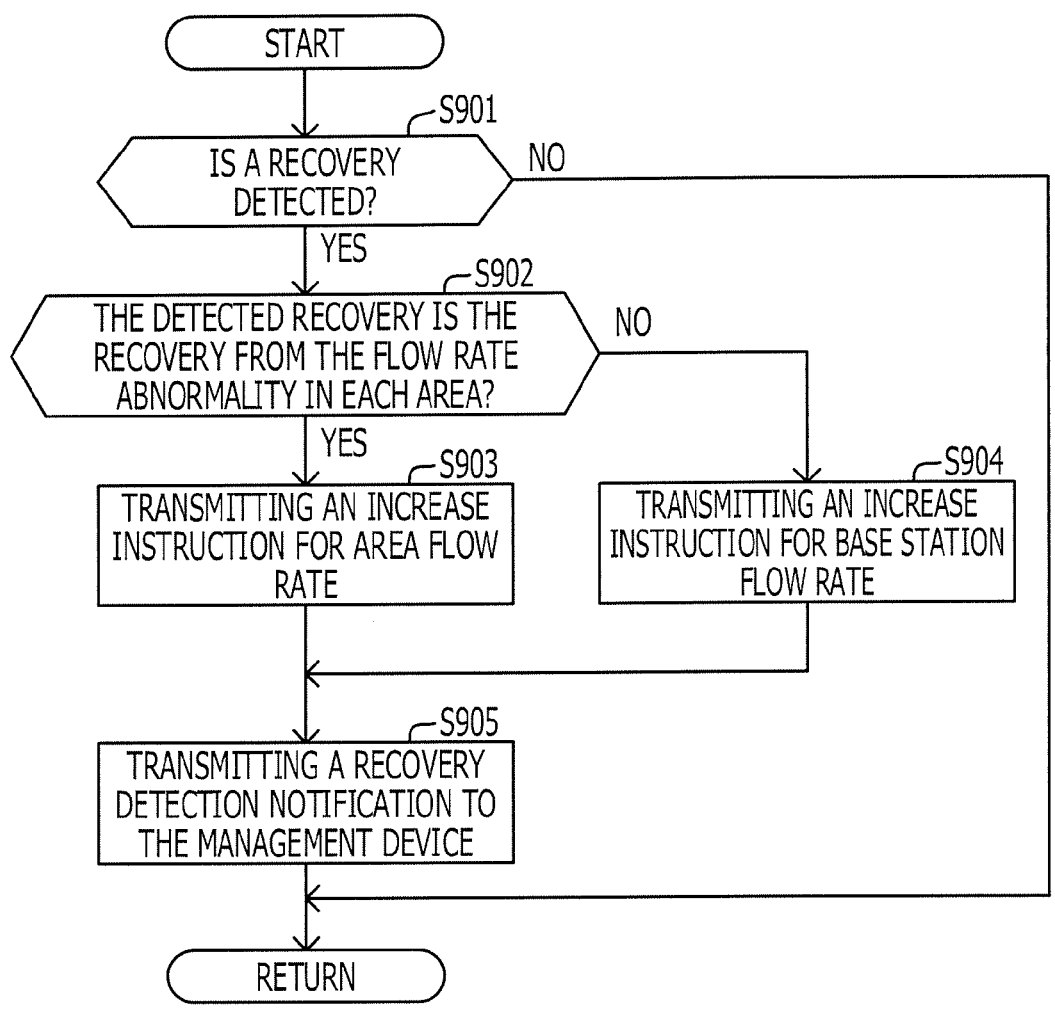
FIG. 19 is a flowchart illustrating an exemplary process performed depending on the type of detected recovery by an access control device of the third embodiment.

When no recovery is detected (No in S901), the access control device 31 does not perform S902 to S905, and the process of FIG. 19 ends.

As described above, the wireless communication system 1 according to the third embodiment is configured to detect the recovery from the occurred abnormality. Furthermore, the processing unit 523 is configured to perform a processing depending on the type of abnormality, the recovery from which has been performed, when the recovery is detected.

According to this, when a recovery from an abnormality is detected (the wireless communication system 1 is recovered from an abnormality), the access control device 31 may perform the processing depending on a type of abnormality, the recovery from which has been performed. As a result, the wireless communication system 1 is able to efficiently cope with the recovery from the abnormality.

In the third embodiment, the wireless communication system 1 may be configured to perform the processing depending on the type of recovery only when the recoveries are detected repeatedly for a predetermined times.

The embodiments are not limited to those described above. Various modifications occurring to a person having ordinary skill in the art may be made to the present embodiments without departing from the scope of the present embodiments.

In each embodiment described above, each function of the wireless communication system is implemented with hardware such as a circuit. However, each device provided in the wireless communication system may be configured to include a processing device and a storage device storing a program (software) as well as configured to cause the processing device to perform the program to implement each function. In this case, the program may be stored in a computer-readable recording medium. For example, the recording medium is a portable medium such as a flexible disk, an optical disk, an opto-magnetic disk and a semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a wireless base station configured to perform a wireless communication with a user terminal; and
an access control device connected to a higher level network at an upstream side while being connected to the wireless base station at a downstream side and configured to control an access by the wireless base station to the higher level network, the access control device including:
a reception unit configured to receive a first signal transmitted from the wireless base station; and
a processing unit configured to perform a processing depending on a type of abnormality which has occurred at the downstream side of the access control device, the type of abnormality being determined, from among plural types of abnormalities, based on the received first signal;
wherein the access control device is configured to establish a session with the wireless base station according to a Point-to-Point Protocol (PPP), and
the wireless base station is configured to
access the higher level network through the established session and
transmit the first signal to the access control device, the first signal including a Link Quality Report (LQR) defined by the PPP.

2. The wireless communication system according to claim 1, wherein the wireless base station includes
a first detection unit configured to detect each of the plural types of abnormalities, and
a transmission unit configured to transmit the first signal to the access control device, the first signal indicating the detected type of abnormality.

3. The wireless communication system according to claim 1, wherein
the wireless base station includes
a transmission unit configured to transmit the first signal to the access control device, the first signal including parameters for detecting each of the plural types of abnormalities, and the access control device includes
a first detection unit configured to detect each of the plural types of abnormalities on the basis of the parameters included in the first signal received from the wireless base station.

4. The wireless communication system according to claim 1, wherein
the access control device includes
a first detection unit configured to detect each of at least one type of abnormality on the basis of a second signal received from a higher level device connected to the higher level network, and
the processing unit is configured to perform, when a first type of abnormality is detected by the first detection unit, a first processing depending on the first type of abnormality.

5. The wireless communication system according to claim 4, wherein
the first type of abnormality is an abnormality in communications between the access control device and the higher level device, and
the first detection unit is configured to detect the first type of abnormality on the basis of a reception data flow rate, the reception data flow rate being an amount of data received by the access control device from the higher level device per unit time.

6. The wireless communication system according to claim 4, further comprising:
a data transmission device connected to the higher level network and configured to transmit data to the wireless base station; and
a management device connected to the higher level network and configured to reset a relay device which relays a communication between the access control device and the data transmission device,
wherein
the first type of abnormality is an abnormality in communications between the access control device and the data transmission device, and
the processing unit is configured to perform, when the detected type of abnormality is the first type of abnormality, the processing of transmitting information upstream for instructing to reset the relay device to the management device.

7. The wireless communication system according to claim 1, further comprising:
a data transmission device connected to the higher level network and configured to transmit data to the wireless base station,
wherein
the plural types of abnormalities includes a first type of abnormality in which a reception data flow rate is a predetermined threshold value or more, the reception data flow rate being an amount of data received by the wireless base station from the data transmission device per unit time, and
the processing unit is configured to perform, when the determined type of abnormality is the first type of abnormality, the processing of transmitting information upstream for instructing to reduce a transmission data flow rate to the data transmission device, the transmission data flow rate being an amount of data transmitted to the wireless base station from the data transmission device per unit time.

8. The wireless communication system according to claim 1, further comprising:
a data transmission device connected to the higher level network and configured to transmit, to the wireless base station, data for a first area allocated to the wireless base station,
wherein
the plural types of abnormalities includes a first type of abnormality in which a reception data flow rate is a predetermined threshold value or more, the reception data flow rate being an amount of data received in the first area by the wireless base station from the data transmission device per unit time, and
the processing unit is configured to perform, when the determined type of abnormality is the first type of abnormality, the processing of transmitting information upstream for instructing to reduce a transmission data flow rate to the data transmission device, the transmission data flow rate being an amount of data transmitted to the first area of the wireless base station from the data transmission device per unit time.

9. The wireless communication system according to claim 1, wherein
the wireless communication system is configured to detect a recovery from the determined type of abnormality, and
the processing unit is configured to perform, when the recovery is detected, a processing depending on the determined type of abnormality.

10. The wireless communication system according to claim 1, wherein the processing unit is configured to transmit information upstream according to the type of abnormality to a destination according to the type of abnormality.

11. A method for controlling wireless communication in a wireless communication system including a wireless base station and an access control device connected to the wireless base station at a downstream side, the access control device controlling an access by the wireless base station to a higher level network connected to the access control device at an upstream side, the method comprising:
receiving, by the access control device, a first signal transmitted from the wireless base station; and
performing a processing depending on a type of abnormality which has occurred at the downstream side of the access control device, the type of abnormality being determined, from among plural types of abnormalities, based on the received first signal;
wherein the access control device is configured to establish a session with the wireless base station according to a Point-to-Point Protocol (PPP), and
the wireless base station is configured to
access the higher level network through the established session and
transmit the first signal to the access control device, the first signal including a Link Quality Report (LQR) defined by the PPP.

12. The method for controlling wireless communication according to claim 11, further comprising transmitting information upstream according to the type of abnormality to a destination according to the type of abnormality.

13. An access control device for controlling an access by a wireless base station to a higher level network, the access control device being connected to the higher level network at an upstream side while being connected to the wireless base station at a downstream side, the access control device comprising:
a reception unit configured to receive a first signal transmitted from the wireless base station; and a processing unit configured to perform a processing depending on a type of abnormality which has occurred at the downstream side of the access control device, the type of abnormality being determined, from among plural types of abnormalities, based on the received first signal;

wherein the access control device is configured to establish a session with the wireless base station according to a Point-to-Point Protocol (PPP), and the wireless base station is configured to access the higher level network through the established session and transmit the first signal to the access control device, the first signal including a Link Quality Report (LQR) defined by the PPP.

14. The access control devices according to claim 13, wherein the processing unit is configured to transmit information upstream according to the type of abnormality to a destination according to the type of abnormality.

* * * * *